(12) United States Patent (10) Patent No.: US 12,598,566 B2

Wanuga et al. (45) Date of Patent: Apr. 7, 2026

(54) IAB TIMING DELTA MAC CE ENHANCEMENT FOR CASE #6 TIMING SUPPORT

(71) Applicant: Nokia Technologies Oy, Espoo (FI)

(72) Inventors: Kevin Wanuga, Souderton, PA (US); Keeth Saliya Laddu Jayasinghe, Espoo (FI); Juha Sakari Korhonen, Espoo (FI); Ilkka Antero Keskitalo, Oulu (FI); Mark Cudak, Rolling Meadows, IL (US)

(73) Assignee: Nokia Technologies Oy, Espoo (FI)

( * ) Notice: Subject to any disclaimer, the term of this patent is extended or adjusted under 35 U.S.C. 154(b) by 325 days.

(21) Appl. No.: 18/032,267

(22) PCT Filed: Aug. 31, 2021

(86) PCT No.: PCT/EP2021/073930
§ 371 (c)(1),
(2) Date: Apr. 17, 2023

(87) PCT Pub. No.: WO2022/078666

PCT Pub. Date: Apr. 21, 2022

(65) Prior Publication Data

US 2023/0403662 A1 Dec. 14, 2023

Related U.S. Application Data

(63) Continuation-in-part of application No. 17/072,328, filed on Oct. 16, 2020, now abandoned.

(51) Int. Cl.
*H04W 56/00* (2009.01)

(52) U.S. Cl.
CPC ..... *H04W 56/0015* (2013.01); *H04W 56/002* (2013.01); *H04W 56/0045* (2013.01)

(58) Field of Classification Search
None
See application file for complete search history.

(56) References Cited

U.S. PATENT DOCUMENTS

| | | | |
|---|---|---|---|
| 2020/0015316 A1 | 1/2020 | Islam et al. | |
| 2022/0039038 A1* | 2/2022 | Liu | H04W 56/0045 |
| 2023/0140165 A1* | 5/2023 | Peng | H04W 56/0045 |
| | | | 370/350 |
| 2023/0309032 A1* | 9/2023 | Ghanbarinejad | H04W 56/0045 |
| 2024/0073839 A1* | 2/2024 | Kurita | H04W 56/0045 |

FOREIGN PATENT DOCUMENTS

| | | | |
|---|---|---|---|
| EP | 3846532 A1 | 7/2021 | |
| WO | WO 2020/063959 A1 | 4/2020 | |
| WO | WO 2020/168082 A1 | 8/2020 | |

* cited by examiner

*Primary Examiner* — Jutai Kao

(74) *Attorney, Agent, or Firm* — McCarter & English, LLP; Joseph C. Drish

(57) ABSTRACT

Methods, apparatuses, and computer programs for timing enhancement for an integrated access and backhaul node are disclosed. A method includes receiving a control element that is used to determine a timing mode and/or associated timing information for an integrated access and backhaul node; determining the timing mode and/or the associated timing information for the integrated access and backhaul node, based on the control element; and applying the timing mode and/or the associated timing information for a subsequent uplink transmission for the integrated access and backhaul node.

21 Claims, 12 Drawing Sheets

| R | R | R | R | R | T_DELTA | OCT 1 |
|---|---|---|---|---|---------|-------|

| T_DELTA | OCT 2 |
|---------|-------|

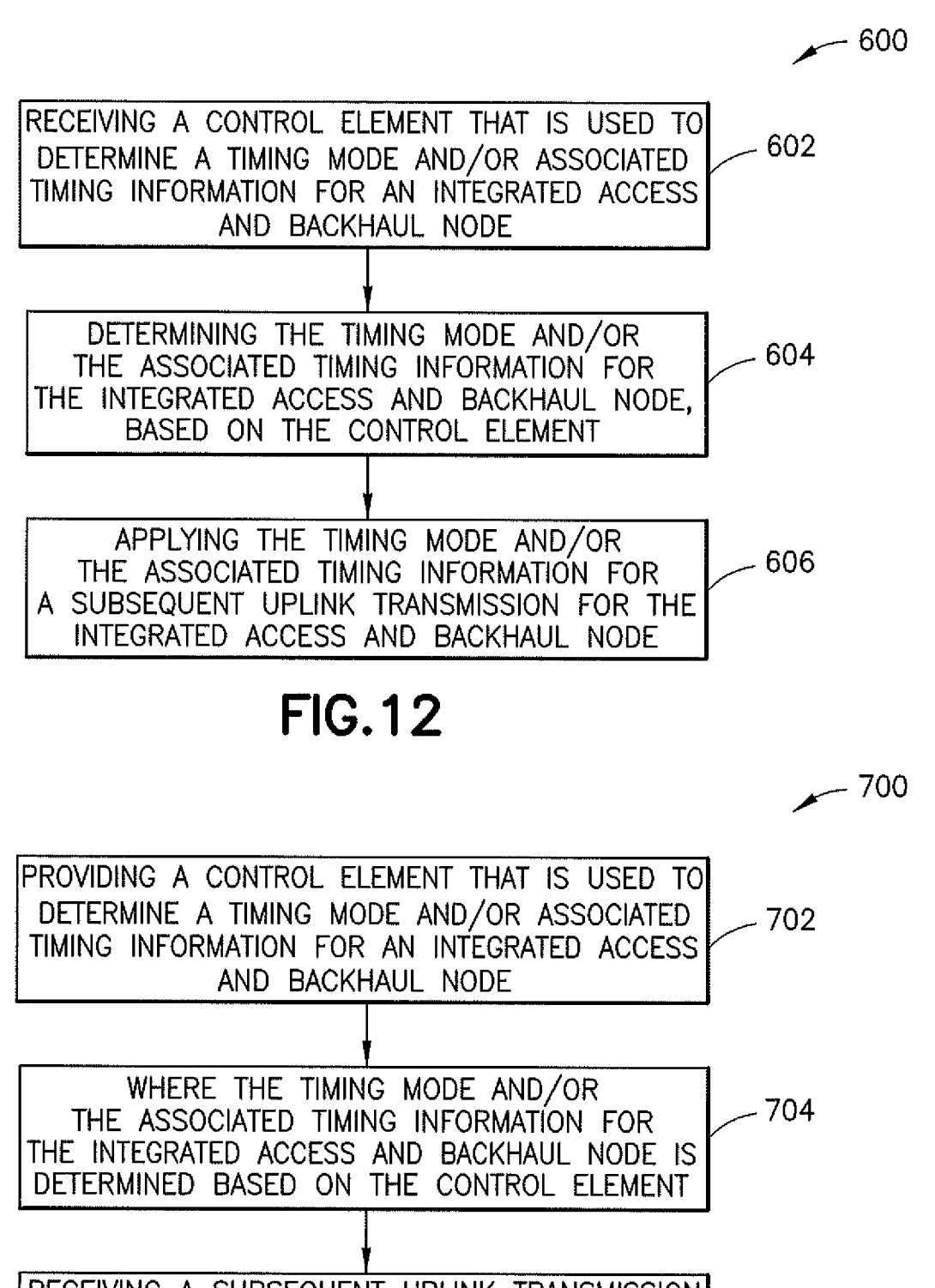

600

RECEIVING A CONTROL ELEMENT THAT IS USED TO DETERMINE A TIMING MODE AND/OR ASSOCIATED TIMING INFORMATION FOR AN INTEGRATED ACCESS AND BACKHAUL NODE ⟋ 602

DETERMINING THE TIMING MODE AND/OR THE ASSOCIATED TIMING INFORMATION FOR THE INTEGRATED ACCESS AND BACKHAUL NODE, BASED ON THE CONTROL ELEMENT ⟋ 604

APPLYING THE TIMING MODE AND/OR THE ASSOCIATED TIMING INFORMATION FOR A SUBSEQUENT UPLINK TRANSMISSION FOR THE INTEGRATED ACCESS AND BACKHAUL NODE ⟋ 606

PROVIDING A CONTROL ELEMENT THAT IS USED TO DETERMINE A TIMING MODE AND/OR ASSOCIATED TIMING INFORMATION FOR AN INTEGRATED ACCESS AND BACKHAUL NODE ⟋ 702

WHERE THE TIMING MODE AND/OR THE ASSOCIATED TIMING INFORMATION FOR THE INTEGRATED ACCESS AND BACKHAUL NODE IS DETERMINED BASED ON THE CONTROL ELEMENT ⟋ 704

RECEIVING A SUBSEQUENT UPLINK TRANSMISSION FROM THE INTEGRATED ACCESS AND BACKHAUL NODE, BASED ON THE DETERMINED TIMING MODE AND/OR ASSOCIATED TIMING INFORMATION ⟋ 706

FIG.13

IAB TIMING DELTA MAC CE ENHANCEMENT FOR CASE #6 TIMING SUPPORT

CROSS REFERENCE TO RELATED APPLICATION

This patent application is a U.S. National Stage application of International Patent Application Number PCT/EP2021/073930 filed Aug. 31, 2021, which claims priority to U.S. Ser. No. 17/072,328 filed Oct. 16, 2020, which are hereby incorporated by reference in their entireties.

TECHNICAL FIELD

The examples and non-limiting embodiments relate generally to communications and, more particularly, to IAB timing delta MAC CE enhancement for case #6 timing support.

BACKGROUND

It is known to integrate access and backhaul in a communications network.

SUMMARY

In accordance with an aspect, a method includes receiving a control element that is used to determine a timing mode and/or associated timing information for an integrated access and backhaul node; determining the timing mode and/or the associated timing information for the integrated access and backhaul node, based on the control element; and applying the timing mode and/or the associated timing information for a subsequent uplink transmission for the integrated access and backhaul node.

In accordance with an aspect, a method includes providing a control element that is used to determine a timing mode and/or associated timing information for an integrated access and backhaul node; where the timing mode and/or the associated timing information for the integrated access and backhaul node is determined based on the control element; and receiving a subsequent uplink transmission from the integrated access and backhaul node, based on the determined timing mode and/or associated timing information.

In accordance with an aspect, an apparatus includes at least one processor; and at least one non-transitory memory including computer program code; where the at least one memory and the computer program code are configured to, with the at least one processor, cause the apparatus at least to perform: receive a control element that is used to determine a timing mode and/or associated timing information for an integrated access and backhaul node; determine the timing mode and/or the associated timing information for the integrated access and backhaul node, based on the control element; and apply the timing mode and/or the associated timing information for a subsequent uplink transmission for the integrated access and backhaul node.

In accordance with an aspect, an apparatus includes at least one processor; and at least one non-transitory memory including computer program code; where the at least one memory and the computer program code are configured to, with the at least one processor, cause the apparatus at least to perform: provide a control element that is used to determine a timing mode and/or associated timing information for an integrated access and backhaul node; where the timing mode and/or the associated timing information for the integrated access and backhaul node is determined based on the control element; and receive a subsequent uplink transmission from the integrated access and backhaul node, based on the determined timing mode and/or associated timing information.

In accordance with an aspect, an apparatus includes means for receiving a control element that is used to determine a timing mode and/or associated timing information for an integrated access and backhaul node; means for determining the timing mode and/or the associated timing information for the integrated access and backhaul node, based on the control element; and means for applying the timing mode and/or the associated timing information for a subsequent uplink transmission for the integrated access and backhaul node.

In accordance with an aspect, an apparatus includes means for providing a control element that is used to determine a timing mode and/or associated timing information for an integrated access and backhaul node; where the timing mode and/or the associated timing information for the integrated access and backhaul node is determined based on the control element; and means for receiving a subsequent uplink transmission from the integrated access and backhaul node, based on the determined timing mode and/or associated timing information.

In accordance with an aspect, a non-transitory program storage device readable by a machine, tangibly embodying a program of instructions executable by the machine for performing operations is provided, the operations comprising: receiving a control element that is used to determine a timing mode and/or associated timing information for an integrated access and backhaul node; determining the timing mode and/or the associated timing information for the integrated access and backhaul node, based on the control element; and applying the timing mode and/or the associated timing information for a subsequent uplink transmission for the integrated access and backhaul node.

In accordance with an aspect, a non-transitory program storage device readable by a machine, tangibly embodying a program of instructions executable by the machine for performing operations is provided, the operations comprising: providing a control element that is used to determine a timing mode and/or associated timing information for an integrated access and backhaul node; where the timing mode and/or the associated timing information for the integrated access and backhaul node is determined based on the control element; and receiving a subsequent uplink transmission from the integrated access and backhaul node, based on the determined timing mode and/or associated timing information.

BRIEF DESCRIPTION OF THE DRAWINGS

The foregoing aspects and other features are explained in the following description, taken in connection with the accompanying drawings, where:

FIG. 12 shows a method to implement IAB timing enhancement, based on the examples described herein.

FIG. 13 shows another method to implement IAB timing enhancement, based on the examples described herein.

DETAILED DESCRIPTION OF EXAMPLE EMBODIMENTS

Figure 1A:
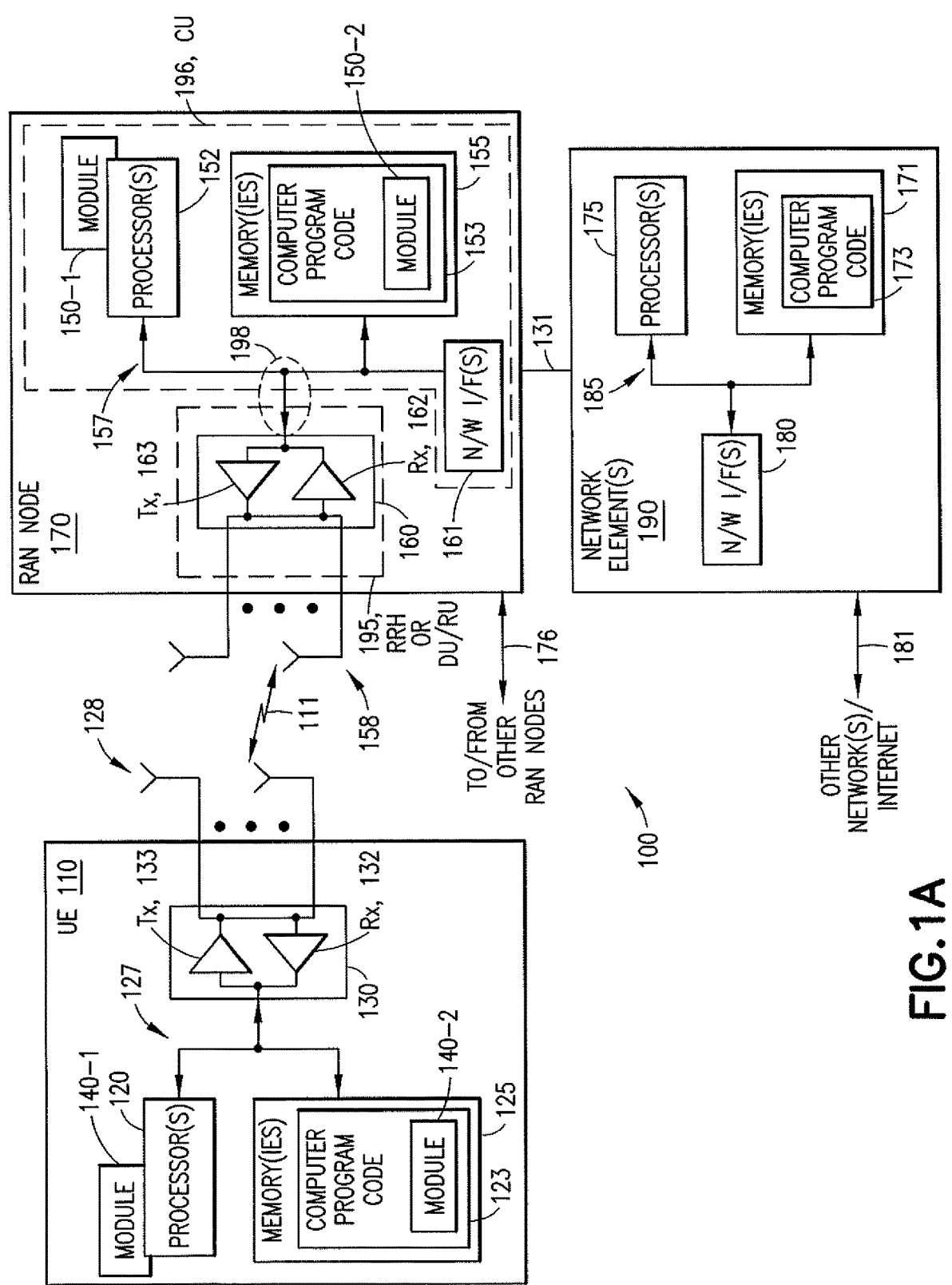
FIG. 1A is a block diagram of one possible and non-limiting system in which the example embodiments may be practiced.

The following acronyms and abbreviations that may be found in the specification and/or the drawing figures are defined as follows:

3GPP third generation partnership project
4G fourth generation
5G fifth generation
5GC 5G core network
Adapt adaption layer holding routing information and enabling hop-by-hop forwarding
Alt. alternative
AMF access and mobility management function
ASIC application-specific integrated circuit
ASMRAP AirScale mmWave radio access point
BH backhaul
BW bandwidth
CE control element
CLI cross-link interference
CPC computer program code
CU central unit or centralized unit
DgNB Donor gNB
DL downlink
DSP digital signal processor
DU distributed unit
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 control interface between CU and DU
F1* interface between DU on an IAB-node and the CU in the IAB-donor
F1-AP F1 application protocol
F1-C F1 control plane interface (e.g. between an IAB node and an IAB donor CU)
F1-U F1 user plane interface
F1-U* interface running over RLC channels on the wireless backhaul between the MT on an IAB-node (e.g. a serving IAB node) and a DU on another IAB node (e.g. the donor)
FFS for further study
FPGA field-programmable gate array
FR frequency range gNB base station for 5G/NR, i.e., a node providing NR user plane and control plane protocol terminations towards the UE, and connected via the NG interface to the 5GC
GNSS global navigation satellite system
GPRS general packet radio service
GTP-U GPRS tunnelling protocol user plane
IAB integrated access and backhaul
ID identifier
I/F interface
I/O input/output
IP internet protocol
L# layer #
LCID logical channel ID
LMF location management function
LTE long term evolution (4G)
MAC medium access control
MME mobility management entity
MT mobile terminal/termination
ng or NG new generation
NGC next generation core
ng-eNB new generation eNB
NG-RAN new generation radio access network
NR new radio (5G)
N/W network
Oct octet
OTA over-the-air
PBCH physical broadcast channel
PDCP packet data convergence protocol
PHY physical layer
R reserved bit
RACH random access channel
RAN radio access network
RAN1 RAN WG1 or radio layer 1
R# or Rel release
RLC radio link control
RO RACH occasion
RRC radio resource control
RRH remote radio head
RU radio unit
Rx receiver or reception
SDAP service data adaptation protocol
SGW serving gateway
SI study item
SMF session management function
SSB synchronization signal/PBCH block
TA timing advance
TDM time-division multiplexing
TP propagation delay
TR technical report
TS technical specification
Tx transmitter or transmission
UDP user datagram protocol
UE user equipment (e.g., a wireless, typically mobile device)
Uu interface between a UE and the DU of a gNB, or an interface between an MT of an IAB node and the DU of an IAB node
UL uplink
UPF user plane function
WI work item
WG working/work group Turning to FIG. 1A, this figure shows a block diagram of one possible and non-limiting example in which the examples may be practiced. A user equipment (UE) 110, radio access network (RAN) node 170, and network element(s) 190 are illustrated. In the example of FIG. 1A, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111. The modules 140-1 and 140-2 may be configured to implement the functionality of the UE as described herein.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entit y)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 1B:
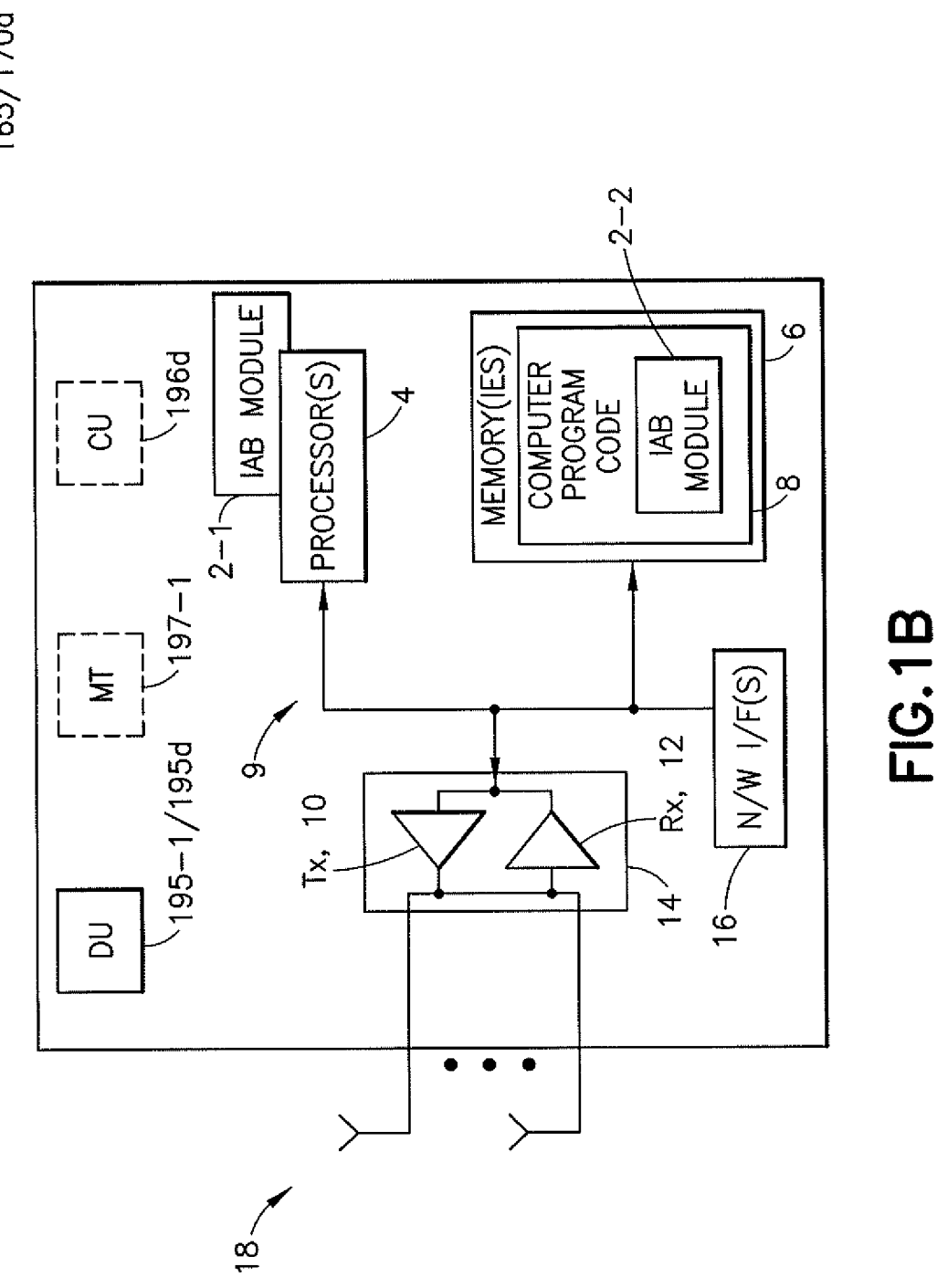
FIG. 1B is a block diagram of an example IAB node.

Turning to FIG. 1B, this figure is a block diagram of possible internal structure of an IAB node. Each IAB node 165/170*d* includes one or more processors 4, one or more memories 6, one or more network interfaces (N/W I/F(s)) 16, and one or more transceivers 14 interconnected through one or more buses 9. Each of the one or more transceivers 14 includes a receiver, Rx, 12 and a transmitter, Tx, 10. The one or more transceivers 14 are connected to one or more antennas 18. The one or more memories 6 include computer program code 8.

The IAB node 165/170*d* includes an IAB module 2, comprising one of or both parts 2-1 and/or 2-2, which may be implemented in a number of ways. The IAB module 2 may be implemented in hardware as IAB module 2-1, such as being implemented as part of the one or more processors 4. The IAB module 2-1 may be implemented also as an integrated circuit or through other hardware such as a programmable gate array. In another example, the IAB module 2 may be implemented as IAB module 2-2, which is implemented as computer program code 8 and is executed by the one or more processors 4. For instance, the one or more memories 6 and the computer program code 8 are configured to, with the one or more processors 4, cause the IAB node 165/170*d* to perform one or more of the operations as described herein.

The one or more network interfaces 16 communicate over a wired or wireless network such as via a corresponding wireless link 111, 112-1, and/or 112-2 (refer to FIG. 1A and FIG. 4), or other IAB links as described herein, e.g., via a transceiver 14 or via circuitry in the network interface 16. A donor IAB node 170*d*, for instance, may use a link 131 to communicate with the NGC 190 (refer to FIG. 1A and FIG. 4), and through this element 190 to other network(s) and/or the Internet 199 (refer e.g. to FIG. 2 and FIG. 3). The one or more buses 9 may be address, data, or control buses, and may include any interconnection mechanism, such as a series of lines on a motherboard or integrated circuit, fiber optics or other optical communication equipment, wireless channels, and the like.

The IAB node 165 comprises DU 195-1 and MT 197-1, functions of which may be involved in the timing related aspects of the embodiments described herein, but not CU 196*d* when not a donor node (hence the dashed lines of CU 196*d* in FIG. 1B). The donor IAB node 170*d* comprises DU 195*d* and CU 196*d*, functions of which also may be involved in the timing related aspects of the embodiments described herein, but not MT 197-1 when acting as a donor node (hence the dashed lines of MT 197-1 in FIG. 1B).

Figure 2:
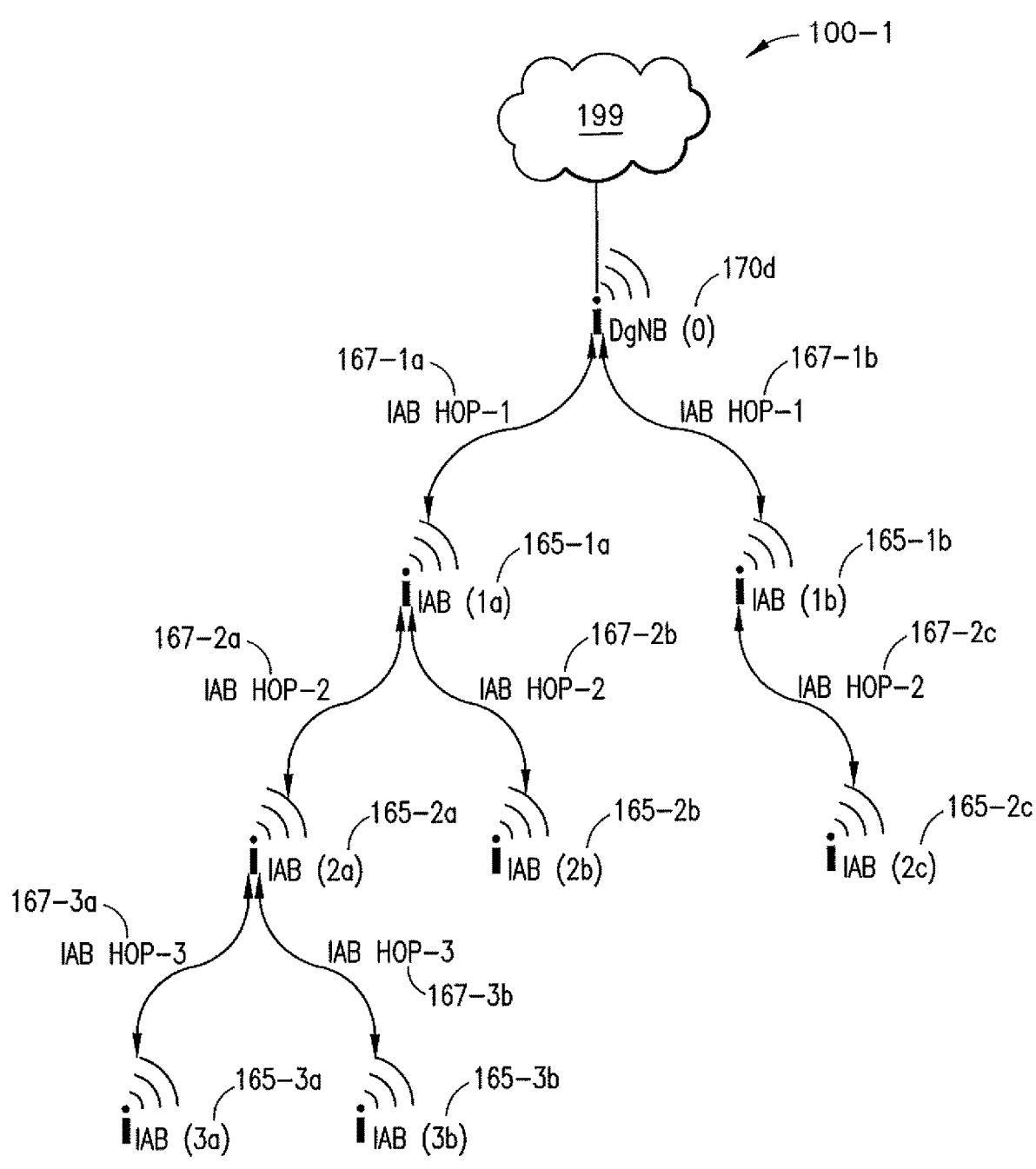
FIG. 2 is an integrated access and backhaul tree showing connections between IAB nodes and a donor gNB.
Figure 3:
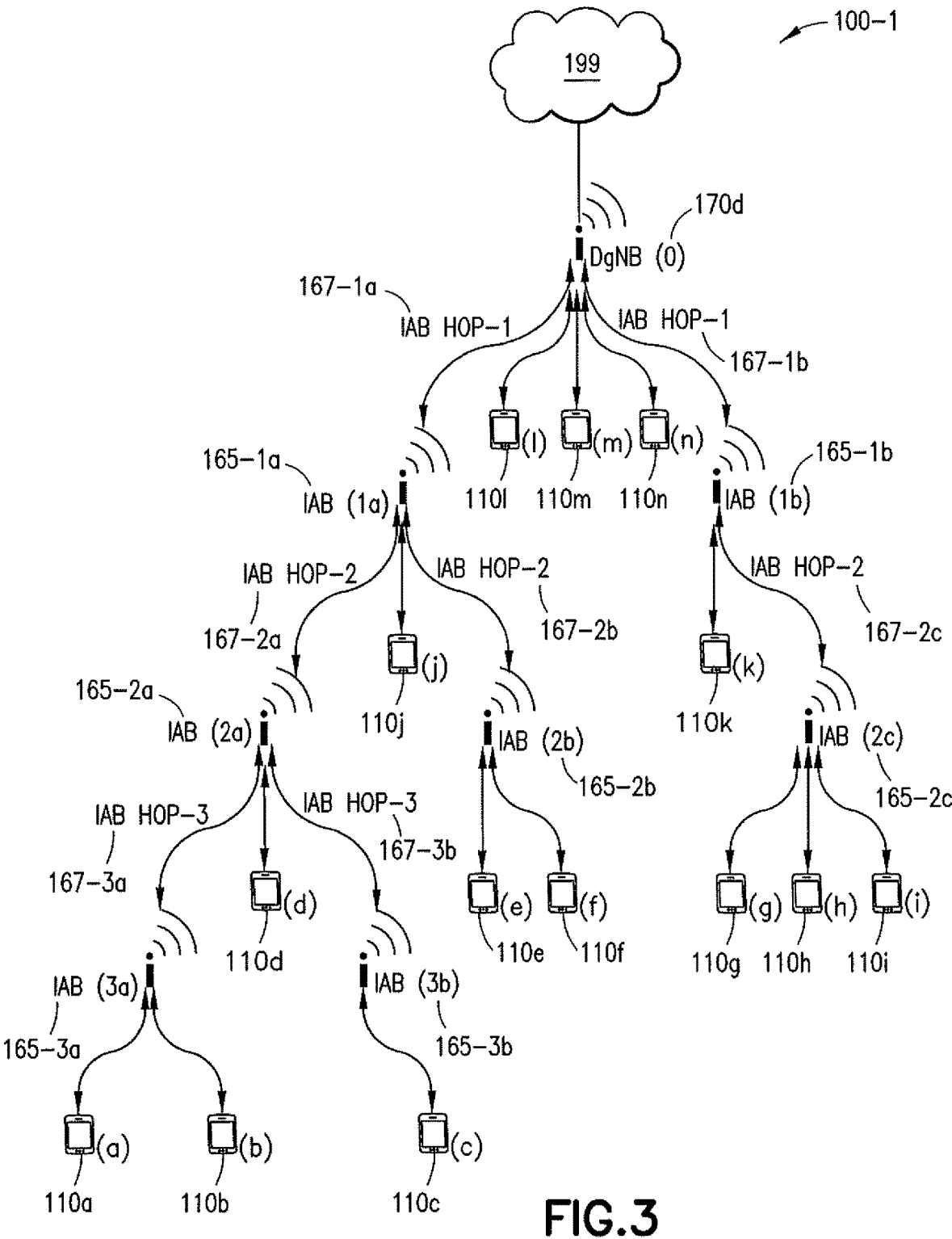
FIG. 3 is an illustration of UEs attached to the IAB network.

The wireless network 100 of FIG. 1A and/or 110-1 of FIG. 2 and FIG. 3 may include a network element or elements 190 that may include core network functionality, and which provides connectivity with a further network, such as a telephone network and/or a data communications network (e.g., the Internet), such as that described previously with respect to FIG. 1A. Such core network functionality for 5G may include access and mobility management function(s)

(AMF(S)) and/or user plane functions (UPF(s)) and/or session management function(s) (SMF(s)).

Although primary emphasis is placed herein on 5G, other technology may be used. For instance, core network functionality for LTE may include MME (Mobility Management Entity)/SGW (Serving Gateway) functionality. These are merely exemplary functions that may be supported by the network element(s) 190, and note that both 5G and LTE functions might be supported. The IAB nodes 165, 170*d* for 5G could be gNB nodes, for instance, and for 4G be eNB nodes, or there could be a combination of gNB and eNB nodes or other base stations, e.g., for other technologies. Thus, IAB node 165 and donor IAB node 170*d* and its components/modules could implement the functionality of the RAN node 170 and its components/modules of FIG. 1A, and vice versa (i.e. RAN node 170 and its components/modules of FIG. 1A could implement the functionality of IAB node 165/170*d*).

The computer readable memory(ies) 6 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memory(ies) 6 may be means for performing storage functions. The processor(s) 4 may be of any type suitable to the local technical environment, and may include one or more of general purpose computers, special purpose computers, microprocessors, digital signal processors (DSPs) and processors based on a multi-core processor architecture, as non-limiting examples. The processor(s) 4 may be means for performing functions, such as controlling the donor IAB node 170*d*, IAB node 165, and other functions as described herein. The parent and child IAB nodes, 165*p* and 165*c*, respectively (refer e.g. to FIG. 5) and other IAB nodes described herein with a reference number prefix of 165 may be IAB node 165/170*d*.

UE 110, RAN node 170, network element(s) 190, and/or IAB node 165/170*d* (and associated memories, computer program code and modules) may be configured to implement IAB timing enhancement, based on the examples described herein. Thus, computer program code 123, module 140-1, module 140-2, and other elements/features shown in FIG. 1A of UE 110 may implement user equipment related aspects of IAB timing enhancement as described herein. Similarly, computer program code 153, module 150-1, module 150-2, and other elements/features shown in FIG. 1A of RAN node 170 may implement gNB related aspects of IAB timing enhancement as described herein, such as for a donor IAB node. Computer program code 173 and other elements/features shown in FIG. 1A of network element(s) 190 may be configured to implement network element related aspects of IAB timing enhancement as described herein. Similarly, CPC 8, IAB module 2-1, IAB module 2-2 and other elements/features shown in FIG. 1B of IAB node 165/170*d* may implement IAB node related aspects of IAB timing enhancement as described herein.

Having thus introduced a suitable but non-limiting technical context for the practice of the exemplary embodiments, the exemplary embodiments will now be described with greater specificity.

The examples described herein are related to 5G New Radio (NR) design. 5G NR shall be able to allow network deployment with minimized manual effort and with as much automated self-configuration as possible. For these reasons NR supports wireless backhaul to connect relay nodes, known as Integrated Access and Backhaul, IAB nodes, with each other and to base stations with fixed connection. More specifically, NR needs to support self-backhauling where the same carrier is used for backhaul connection as well as for the access links, i.e., enabling in-band backhaul operation.

The IAB network is connected wirelessly with each IAB node receiving service from a parent node and may provide service to the next hop IAB node or UE, its child. FIG. 2 illustrates a 3 hop IAB network 100-1 including: (i) IAB nodes (1*a*) and (1*b*) (respectively 165-1*a* and 165-1*b*) receiving backhaul service respectively via IAB Hop-1 167-1*a* and IAB Hop-1 167-1*b* from the parent Donor gNB (0)-170*d*; (ii) IAB nodes (2*a*) and (2*b*) (respectively 165-2*a* and 165-2*b*) receiving backhaul service respectively via IAB Hop-2 167-2*a* and IAB Hop-2 167-2*b* from the parent IAB node (1*a*)-165-1*a*; (iii) IAB node (2*c*)-165-2*c* receiving backhaul service via IAB Hop-2 167-2*c* from the parent IAB node (1*b*)-165-1*b*; and (iv) IAB nodes (3*a*) and (3*b*) (respectively 165-3*a* and 165-3*b*) receiving service respectively via IAB Hop-3 167-3*a* and IAB Hop-3 167-3*b* from the parent IAB node (2*a*)-165-2*a*. The IAB network 100-1 provides wireless access to e.g. network 199.

The IAB network 100-1 provides wireless access to a plurality of UEs where each UE connects directly to a Donor gNB or an IAB node. FIG. 3 illustrates the connection of 14 UEs, lettered (a) through (n), connected to the IAB network 110-1 at various IAB nodes (collectively 165) or directly to the Donor gNB 170*d*. Shown in FIG. 3 are UEs 110*a*, 110*b*, 110*c*, 110*d*, 110*e*, 110*f*, 110*g*, 110*h*, 110*i*, 110*j*, 110*k*, 1101, 110*m*, and 110*n*.

Figure 4:
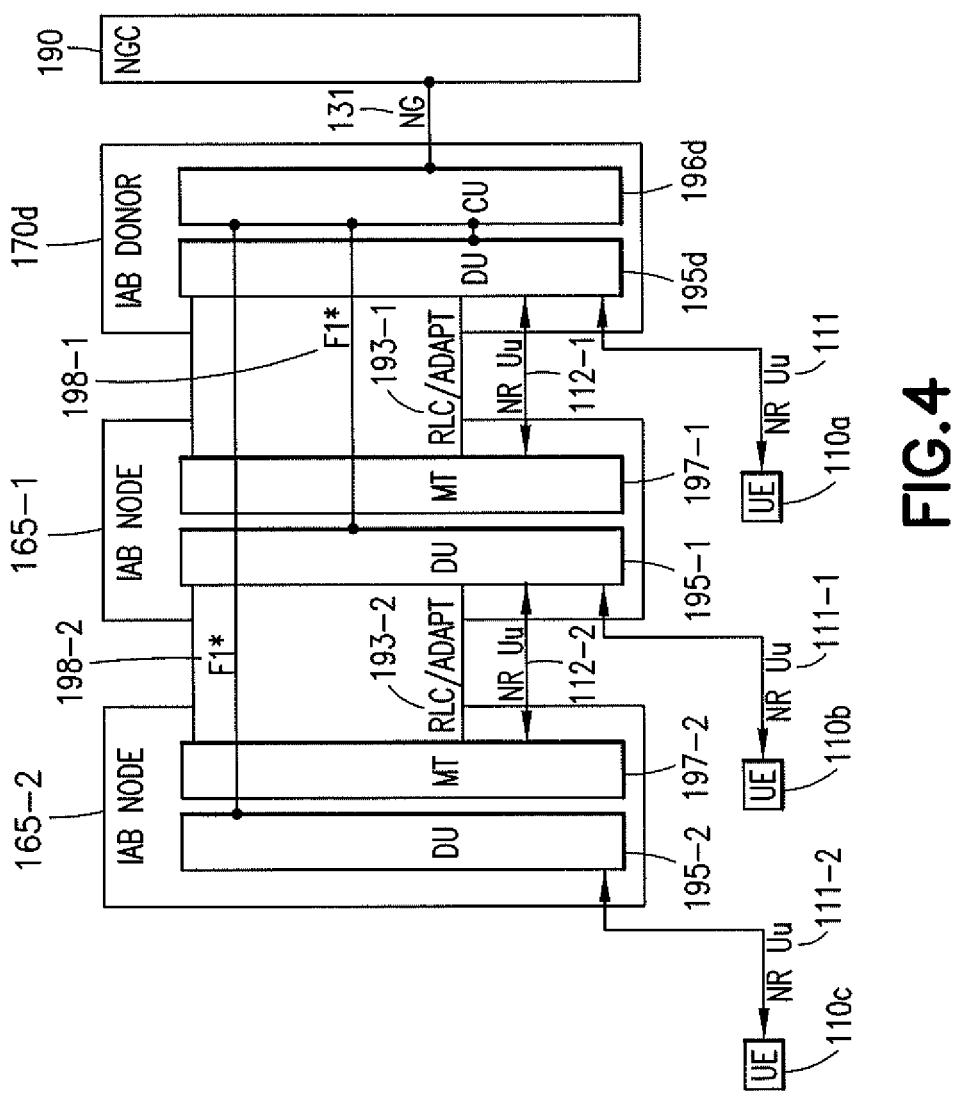
FIG. 4 shows an example IAB architecture for architecture 1a of TR 38.874.

FIG. 4 shows a high-level architecture adopted as the basis for the IAB R16 WI with L2 relaying leveraging the split gNB architecture.

The donor node 170*d* hosts the centralized unit (CU) 196*d* for all IAB nodes (such as IAB node 165-1 and 165-2), i.e. it runs RRC, higher L2 (PDCP) and control functions for the subtending IAB topology. Distributed units (DUs) (including DUs 195*d*, 195-1, and 195-2) reside at the IAB nodes hosting the lower L2 radio protocol layers (such as RLC 193-1 and 193-2, MAC) and the physical (PHY) layer. The CU 196*d* has two control interfaces to the IAB nodes 165-1 and 165-2, namely RRC connection to the IAB-MT (such as IAB-MT 197-1 and IAB-MT 197-2) and F1-C (via e.g. F* 198-1 and F* 198-2) to the IAB-DU (such as DU 195-1 and DU 195-2). Hence both RRC signaling and F1-AP are available for the IAB configuration and control. With this architecture the radio resources usage can have central coordination by the donor CU 196*d*.

The Donor gNB 170*d* and IAB nodes 165-1 and 165-2 share the wireless resources between backhaul (via e.g. 112-1 and 112-2) and access (via e.g. 111, 111-1, and 111-2) to the UEs 110*a*, 110*b*, and 110*c*. The resources may include wireless spectrum and wireless transceivers. As further shown in FIG. 4, the IAB donor 170*d* is coupled via NG link 131 to network element 190, a next generation core (NGC) element, which network element 190 is also shown in FIG. 1A.

Figure 5:
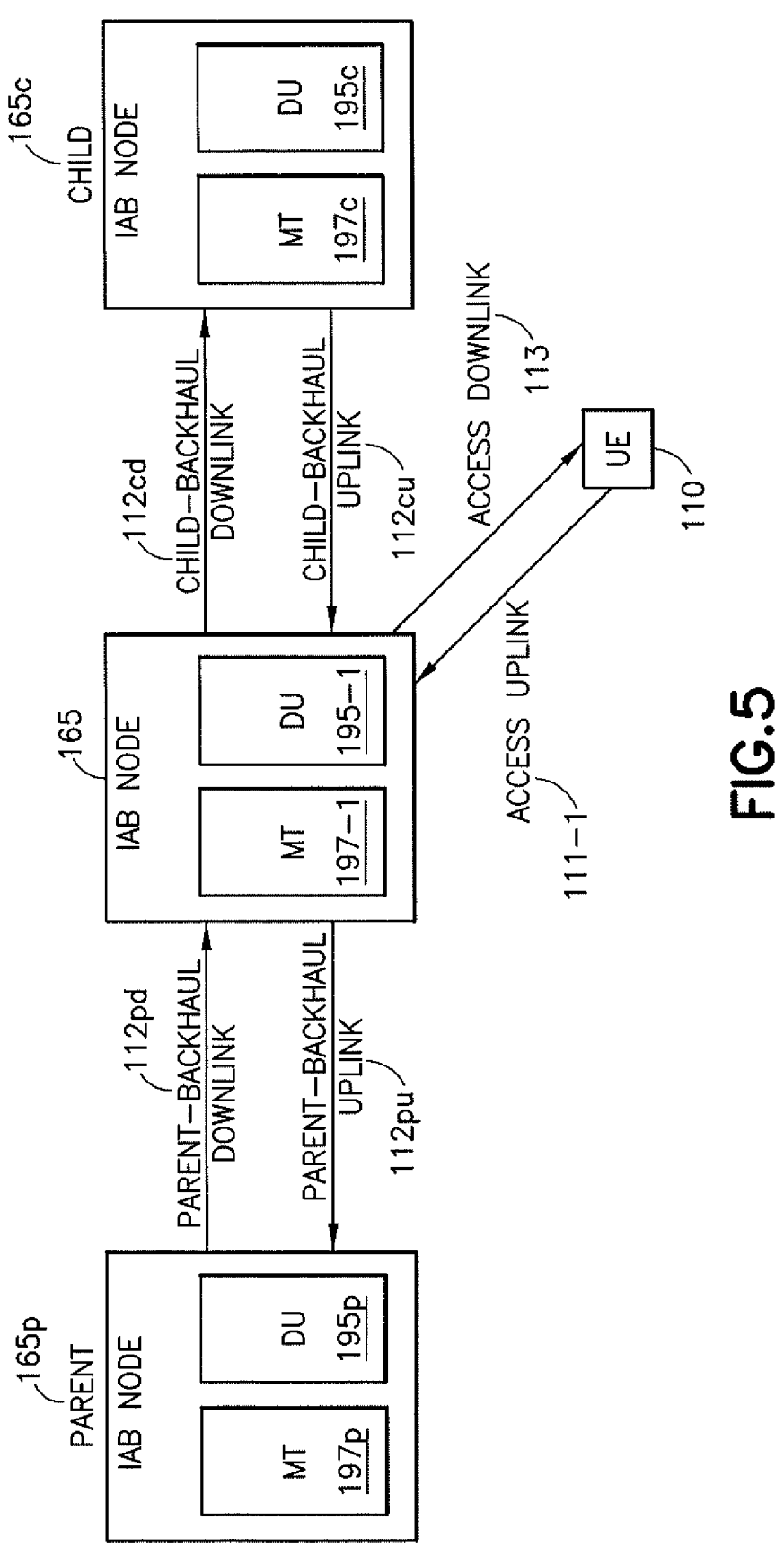
FIG. 5 shows an example IAB node relationship to parent and child nodes.

FIG. 5 shows the relationship of an IAB node 165 to parent IAB node 165*p*, child IAB node 165*c* and access UEs 110. The IAB node 165 uses the MT function 197-1 for communicating with the parent node 165*p* for backhaul service (e.g. via parent-backhaul downlink 112*pd* and parent-backhaul uplink 112*pu*) and a gNB distributed unit (DU) function 195-1 for providing wireless access for both UEs 110 via access uplink 111-1 and access downlink 113, and child (next hop) IAB nodes 165*c* via child-backhaul downlink 112*cd* and child-backhaul uplink 112*cu*.

The parent DU function 195p located in either the donor gNB 170d and in the parent IAB nodes 165p schedule both downlink 113 and uplink 111-1 access traffic along with the outbound and inbound backhaul traffic (e.g. 112pd and 112pu) for the attached UEs (such as UE 110l, UE 110m, and 110n attached to DgNB 170d in FIG. 3) and IAB node UEs (such as 110 in FIG. 5, or UE 110j attached to IAB node 165-1a), respectively. Parent IAB node 165p also comprises MT function 197p, and child IAB node 165c comprises a DU function 195c and MT function 197c.

IAB MT function 197-1 and IAB DU function 195-1 are assumed to share a common transceiver (e.g. transceiver 14 of FIG. 1B), where the common transceiver prevents the IAB node DU 195-1 from utilizing the transceiver for access traffic (111-1 and 113) or child backhaul traffic (112cd and 112cu) when the IAB node UE 110 is scheduled for parent backhaul traffic (e.g. 112pd and 112pu). Rel.16 IAB was limited to TDM operation where IAB-MT and IAB-DU usage was separated in time.

The IAB node 165 may further contain multiple sectors with multiple DU functions for each respective cell served by each sector. In Rel-16, but not for an IAB in general, a further half-duplex constraint is imposed such that all sectors are either transmitting or receiving, where the transceivers transmit function may serve outbound backhaul traffic or downlink access traffic and the receive function may serve inbound backhaul traffic and uplink UE traffic.

Figure 6:
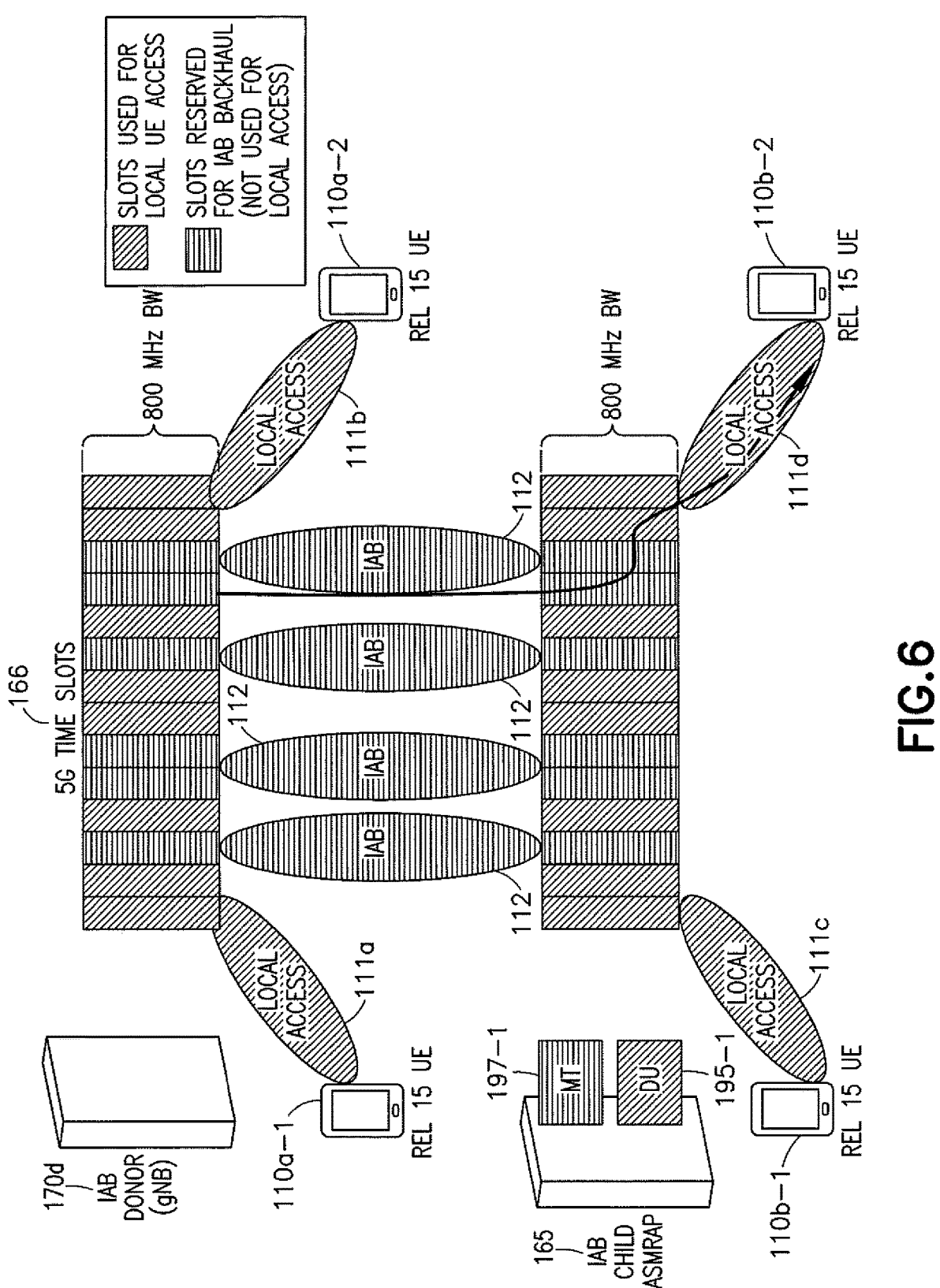
FIG. 6 shows Rel-16 IAB TDM.

R16 has defined IAB mechanisms for time-multiplexing access and backhaul. Any given slot or symbol may be used for communication between the IAB node 165 and the parent node 165p; or be used for communication between the IAB node 165 and the child node 165c or access UE 110. FIG. 6 illustrates the sharing of time slots 166 for access (111a, 111b, 111c, 111d provided respectively for UE 110a-1, UE 110a-2, UE 110b-1, UE 110b-2) and backhaul 112.

Figure 7:
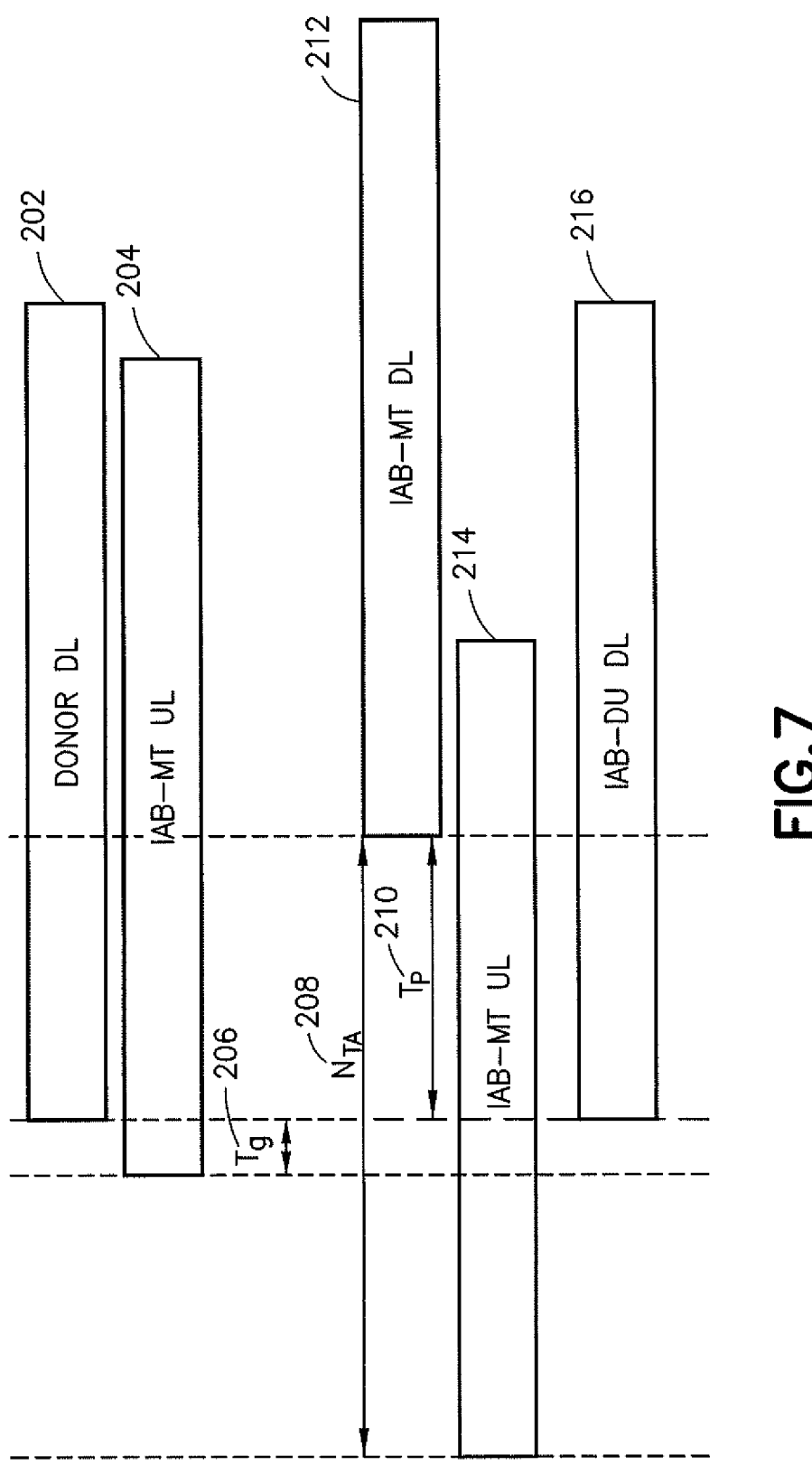
FIG. 7 shows the IAB timing synchronization scenario for Rel-16 IAB.

In order to limit cross-link interference (CLI) between adjacent links (i.e. parent and child links) TS 38.133 requires that all DU transmissions occur synchronously. While this synchronization can be maintained using GNSS, IAB-nodes that do not have GNSS capability or are unable to receive GNSS signals (e.g. indoors, in tunnels) require an OTA procedure for maintaining synchronization (OTA synchronization takes place in case #1 and case #6). In Rel-16 3GPP enabled this through use of TA-based timing alignment, by specifying a MAC CE signal that can indicate the desired offset of the IAB-DU timing relative to the IAB-MT TA, as illustrated in FIG. 7.

Figures 8, 9:
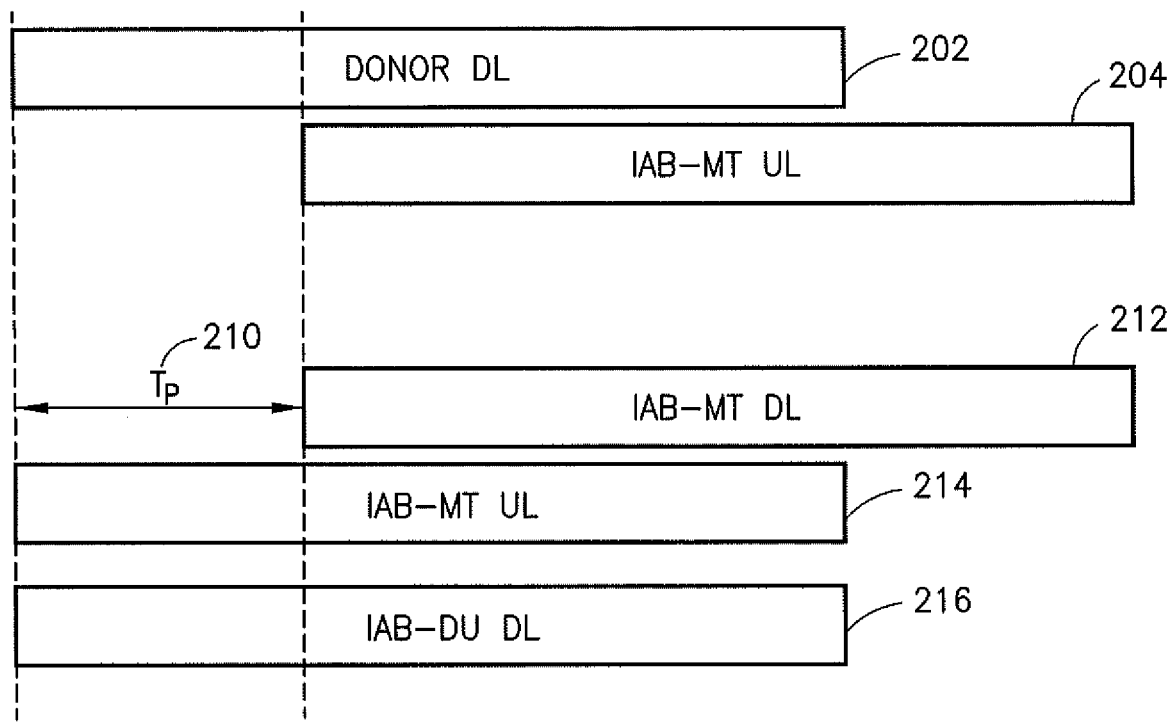
FIG. 8 shows the supported timing mode for simultaneous IAB-DU/IAB-MT transmission.
FIG. 9 shows FIG. 6.1.3.21-1: Timing Delta MAC CE from TS 38.321.

An alternative timing mode, referred as Case #6, where both the IAB-DU 195-1 and IAB-MT 197-1 are transmitting simultaneously (refer e.g. in FIG. 8 to IAB-MT UL 214 being simultaneous with IAB-DU DL 216) requires IAB-DU DL transmission 216 to be synchronous across DUs and donor nodes (refer to 202 in FIG. 8), but further requires IAB-MT UL transmission 214 to be performed synchronously with IAB-DU DL transmission 216 as shown in FIG. 8.

There may be two alternatives when supporting case #6. In one variant, Alt.1, the IAB node may need to maintain both case #1 and case #6 based UL transmissions to derive the DL alignment between IAB nodes. The main reason is that when an IAB node is operating in Case #6 timing mode, TA-based timing for UL transmission is not used and estimation of propagation delay becomes problematic. In another alternative, Alt.2, it is possible to provide enhanced signaling without relying on the case #1 timing mode, where the enhanced signaling is independently used also for the DL timing alignment.

An IAB-MT is configured with a timing advance (TA), e.g. 208, which configures the IAB-MT UL transmission (e.g. 204 and 214) relative to its corresponding IAB-MT DL reception timing 212 during the RACH procedure used for initial access. After the RACH procedure the parent node 165p/170d (see e.g. Donor and related donor timing 202) is aware of the propagation latency, $T_P$ 210, and can determine the optimal offset for IAB-DU timing (e.g. 216). This offset value, $T_{delta}$, is sent to the IAB node 165 where the DU 195-1 configures its timing offset as $$\left(\frac{N_{TA}}{2} + N_{delta} + T_{delta} \cdot G_{step}\right) \cdot T_c, \qquad \text{(Equation 1)}$$

$N_{delta}=-70528$ and $G_{step}=64$ if the serving cell providing $T_{delta}$ is in FR2. $N_{delta}=-17664$ and $G_{step}=32$ if the serving cell providing $T_{delta}$ is in FR1. Shown also in FIG. 7 is $T_g$ 206.

When an IAB node 165 begins an initial access procedure it may achieve downlink timing synchronization from measurement of parent SSB transmissions and indicate propagation delay to the parent node 165p through transmission of the selected RACH preamble during the RACH procedure. The RACH preamble is sent with timing advance value=0 enabling the parent node to estimate the (two way) propagation delay from the reception time of the preamble. Based on this the parent determines the initial timing advance (TA) command sent to the IAB-MT in the random access response (RAR) message. From then on the TA commands are relative (delta) to the existing TA value.

When TA, applied by MT, is controlled in Case 1 timing, IAB node DU TX timing is obtained by estimating that the propagation delay is given by Equation 2:

$$TP = \left(\frac{N_{TA}}{2} + N_{delta} + T_{delta} \cdot G_{step}\right) \cdot T_c, \qquad \text{(Equation 2)}$$

$N_{delta}=-70528$ and $G_{step}=64$ if the serving cell providing $T_{delta}$ is in FR2. $N_{delta}=-17664$ and $G_{step}=32$ if the serving cell providing $T_{delta}$ is in FR1.

Once the parent node 165p has determined propagation delay and the IAB node 165 has received RRCSetupComplete, the IAB node 165 may be provided its initial case #1 timing synchronization via a MAC CE. At this time an IAB node 165 that has a capability for non-TDM multiplexing may be configured to operate in case #6 timing mode. While in case #6 timing, the IAB-MT 197-1 may perform all uplink transmissions synchronized at the symbol-level with IAB-DU 195-1 downlink transmissions.

TS 38.321 provides the following description for the format of the MAC CE used to provide timing offset when synchronizing IAB-DU transmissions for case #1 timing support, stating (referring to FIG. 9):

The Timing Delta MAC CE is identified by MAC subheader with LCID as specified in Table 6.2.1-1.

It has a fixed size and consists of two octets defined as follows (FIG. 6.1.3.21-1):

R: Reserved bit, set to 0;

T_delta: This field indicates the index value of $T_{delta}$ (0, 1, 2 . . . 1199) used to control the amount of timing adjustment that MAC entity indicates (as specified in TS 38.213 [6]). The length of the field is 11 bits.

TS 38.213 describes how the timing delta MAC CE is used to update timing with Case #1: An IAB-MT uses a timing advance (TA) which configures the IAB-MT UL transmission relative to its corresponding IAB-MT DL reception timing. The parent node can further indicate via timing delta MAC CE a required offset to align IAB-DU timing with the parent DL transmission timing. This offset value, $T_{delta}$, is sent to the IAB node where the DU configures its timing offset relative to the MT RX timing as indicated previously.

For an IAB node which supports case #6 timing mode, the parent node may use the same MAC-CE command that it uses for $T_{delta}$ signaling to also indicate the timing difference between UL reception (RX) (from an IAB-MT) and DL transmission (TX) at the parent node.

The IAB node (MT) may recognize the same MAC-CE command differently, depending on the indications provided in the reserved entries or by other configurations used to indicate Case #1 vs Case #6 timing modes.

In one variant, the reserved bits may be used to indicate the timing mode: (i) if all reserved bits are set to the IAB MT may consider that the received MAC-CE is indicating the legacy $T_{delta}$ signaling. Otherwise, the IAB MT may read the bit fields (including all or few reserved entries) as the timing difference between UL RX and DL TX at the parent node; (ii) if some of the reserved bits are used to indicate the timing mode, the IAB MT may determine first the timing mode based on the indication of the some of the reserved bits.

When the case #1 is indicated, the IAB MT reads the last 11 bits of the $T_{delta}$ MAC-CE as the legacy $T_{delta}$ signaling. Otherwise, the IAB MT reads the last set of bits (11 bits or more) as the timing difference between UL RX and DL TX at the parent node.

In another variant, the reserved bits may not be used for timing mode indication, but the parent may use another configuration or signaling to indicate/activate a timing mode in IAB MT UL, and the IAB MT may apply the MAC-CE command corresponding to the indicated/activated timing mode.

In another variant, the case #6 related timing information (the timing difference between UL RX and DL TX at the parent node) may be sent by the parent only when the IAB MT uses case #6 mode timing in UL transmission. The use of case #6 timing at the IAB node may be defined/configured for a given period by the parent/CU such that the parent can estimate the timing different between UL RX and DL TX.

Similarly, if the case #1 timing mode related timing information is sent, the use of legacy UL (based on TA) is used at the IAB MT for a given period.

Embodiment 1 proposes using the reserved bits of the $T_{delta}$ MAC CE to indicate one of two separate timing modes for the IAB node: (1) When reserve bits match a bit pattern (e.g. are set to zero, etc.), the IAB node interprets relevant data fields of the MAC CE as the indication of $T_{delta}$ as specified in TS 38.213; or (2) When reserve bits match an alternative bit pattern (e.g. some or any reserve bits not set to zero), the IAB node interprets a timing offset relative to IAB-MT DL Rx timing (e.g. timing difference to support Case #6). Here, the parent may also exclude MAC-CE signaling used for TA indication.

Embodiment 2 proposes using the reserved bits of the $T_{delta}$ MAC CE to indicate one of two separate timing modes for the IAB node, and additional configuration parameters for the timing offset: (1) When reserve bits match a bit pattern (e.g. are set to zero, etc.), the IAB node interprets relevant data fields of the MAC CE as the indication of $T_{delta}$ as specified in TS 38.213; or (2) When reserve bits match an alternative bit pattern (e.g. some reserve bits are not set to zero), the IAB node interprets a timing offset relative to IAB-MT DL Rx timing. Additionally, some additional bit pattern (e.g. a configuration of reserved bits not used for the timing mode indication) may indicate further configuration parameters for the alternative timing mode (e.g. N reserved bits indicate $2^N$ unique configurations of range and/or resolution for timing offset values).

Embodiment 3 proposes that interpretation of the $T_{delta}$ MAC CE timing mode indication may be interpreted based on the context in which the MAC CE is recovered (e.g. if the slot in which the MAC CE is recovered, or the slot immediately following the slot in which the MAC CE is recovered, are configured for non-TDM operation, the IAB node interprets the timing offset as relative to IAB-MT DL Rx timing rather than relative to TA offset timing).

Embodiment 4 proposes that the IAB node maintains the propagation delay estimate based on the DU TX-RX offset signaled by the parent (Alt. 2 for Case *6 timing adjustment discussed previously) and obtains TA for Case #1 timing from the propagation delay estimate and $T_{delta}$. Also in this embodiment the present use of the MAC CE for $T_{delta}$ signaling can be extended for DU TX-RX offset signaling.

When operating in non-TDM mode, the IAB-MT and/or IAB-DU may receive an indication to use an alternative timing offset for non-TDM transmissions (e.g. $T_{delta}$ MAC CE with an alternative timing indication bit). When receiving an alternative timing indication, the IAB node may assume an alternative timing reference for which the offset is indicated (e.g. relative to IAB-MT Rx timing, rather than TA). Additionally, the IAB node may assume an alternative range of resolution of timing offset indication (e.g. an offset step size that is smaller or larger than the original $T_{delta}$ offset).

The IAB node 165/170d may alternate between both TDM and non-TDM modes of operation, using both conventional and non-conventional indications, respectively. An IAB node may also receive an indication (e.g. a unique pattern of reserved bits) that the node may be required to take steps to recover timing synch (e.g. initiate RACH procedure, revert to case #1 timing, etc.). Alternatively, an IAB node may be configured with a rest timer (e.g. N slots from the reception of $T_{delta}$ MAC CE), upon which expiration the IAB node may be required to perform a timing correction procedure (e.g. initiate a RACH procedure).

When DU TX timing is maintained using Alt.2 for Case 6 timing, the IAB node 165 may adjust (DU and MT) TX timing relative to the MT Rx timing so that the TX-RX offset keeps equal to the parent's DU TX-RX offset (that the parent signals to the IAB node). This offset is then an estimate of the propagation delay TP.

Embodiment 4 as described herein is meant for the situation that both Case 1 and Case 6 MT TX timings may need to be maintained by an IAB node. In this situation, Option 1 is that propagation delay TP is obtained by Case 1 TA control and Case 6 timing is set using that estimate. (This is Alt. 1 discussed previously) Option 2 (Embodiment 4) is that the propagation delay is obtained with Alt. 2 of Case 6 timing maintenance, and this propagation delay is used to calculate $N_{TA}$ for Case 1 MT TX timing:

$$N_{TA}=2*(TP-(N_{delta}+T_{delta}\cdot G_{step})\cdot T_c) \qquad (3)$$

With Option 1, the parent signals only $T_{delta}$. With Option 2, the enhanced timing offset MAC-CE carries either the parent's observed DU TX-RX offset or $T_{delta}$ i.e. DU TX-RX offset for TP determination or $T_{delta}$ for Case 1 TA.

Figure 10:
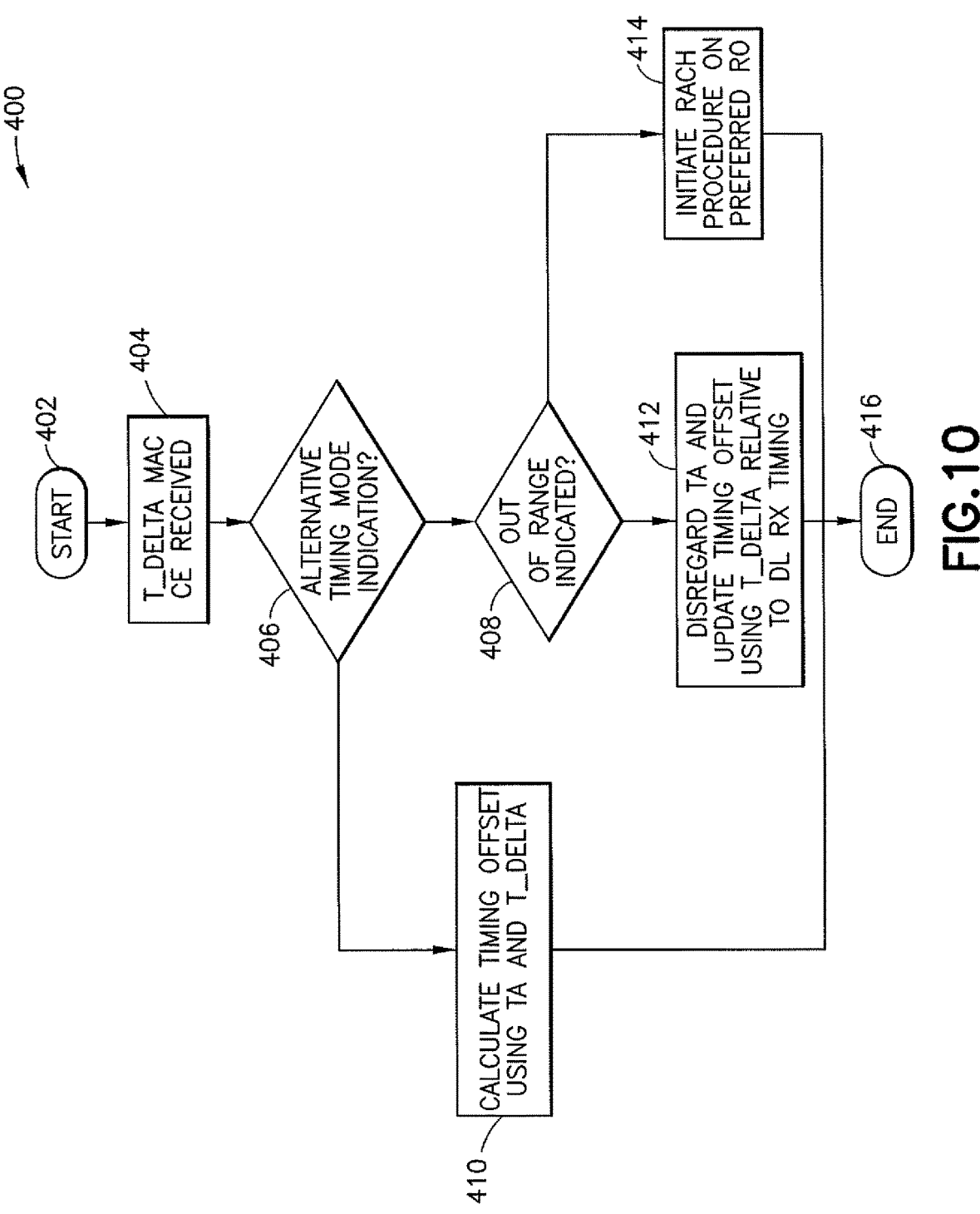
FIG. 10 is an example flowchart of an IAB determining a timing mode indication from a received T del ta MAC CE, based on the examples described herein.

An example state flow diagram 400, starting at 402, of the IAB node 165 using the enhanced synchronization timing offset MAC CE, the T_delta MAC CE being received at 404, is shown in FIG. 10.

In FIG. 10, the IAB node 165 has already received UL timing alignment $N_{T4}$. An indication at 406 that alternative timing (e.g. mode) alignment is not being indicated, directs the IAB node 165 at 410 to apply/calculate the timing offset using $T_{delta}$ relative to TA, as indicated in Section 14 of TS 38.213. If the IAB node 165 at 406 determines that the alternative timing mode is indicated, it 165 may first check at 408 to determine that the timing offset is within range of possible indicated values. If the value is out of range, the IAB-MT at 414 may be required to initiate a RACH procedure on the next available preferred RO to reset IAB node timing. Otherwise, at 412 the IAB node 165 may disregard the TA configuration, and apply (e.g. update) the $T_{delta}$ timing offset relative to the IAB-MT DL Rx timing. The method 400 ends at 416.

When an IAB-MT is capable of operating in non-TDM multiplexing mode between IAB-MT and IAB-DU, the IAB node may be configured with a plurality of alternative timing offset configurations (e.g. one of several possible indications for $T_{offset_{min}}$, $T_{offset_{max}}$, $T_\Delta$, etc.). When operating in non-TDM mode the IAB-MT and/or IAB-DU may receive an indication to use an alternative timing offset for non-TDM transmissions (e.g. a $T_{delta}$ MAC CE with an alternative timing indication bit). In addition to the indication of an alternative timing mode, the IAB node also receives a configuration index (e.g. a bit pattern from a subset of reserved bits). When receiving an alternative timing indication, the IAB node may assume an alternative timing reference for which the offset is indicated (e.g. relative to IAB-MT Rx timing, rather than TA). When receiving the alternative timing indication the IAB node may use the indicated parameters for computing the alternative timing offset (e.g. $T_{offset_{min}}+T_\Delta \cdot T_{delta}$).

An IAB node may have a configured (e.g. RRC) or pre-arranged (e.g. explicitly specified) context in which the $T_{delta}$ MAC CE is interpreted, if the IAB node receives a $T_{delta}$ MAC CE in some relation (i.e. concurrent, immediately preceding, etc.) to the IAB mode of operation (e.g. TDM, non-TDM). The IAB node may assume that the method of timing offset indication is relevant to the mode of operation (e.g. an alternative $T_{delta}$ timing indication is provided when received in non-TDM mode at the IAB-MT, etc.).

There are several advantages and technical effects of the examples described herein. Optimal timing support in non-TDM reduces CLI and simplifies resource multiplexing management by removing the effect of propagation latency on resource orthogonality. The described alternative use of the $T_{delta}$ MAC CE enables proper alignment without the use of TA signaling. Allowing multiple configurations of the timing offset enables flexible signaling of timing modes and ensures alternative timing modes can be supported over a wide range of propagation latencies. Also, context dependent signaling reduces overhead of explicit indication for alternative timing modes.

The examples described herein are also relevant to 3GPP standardadization, as they directly impact the R17 IAB specification in 38.213 and 38.321, including an enhanced MAC CE along with new IAB node behavior.

Figure 11:
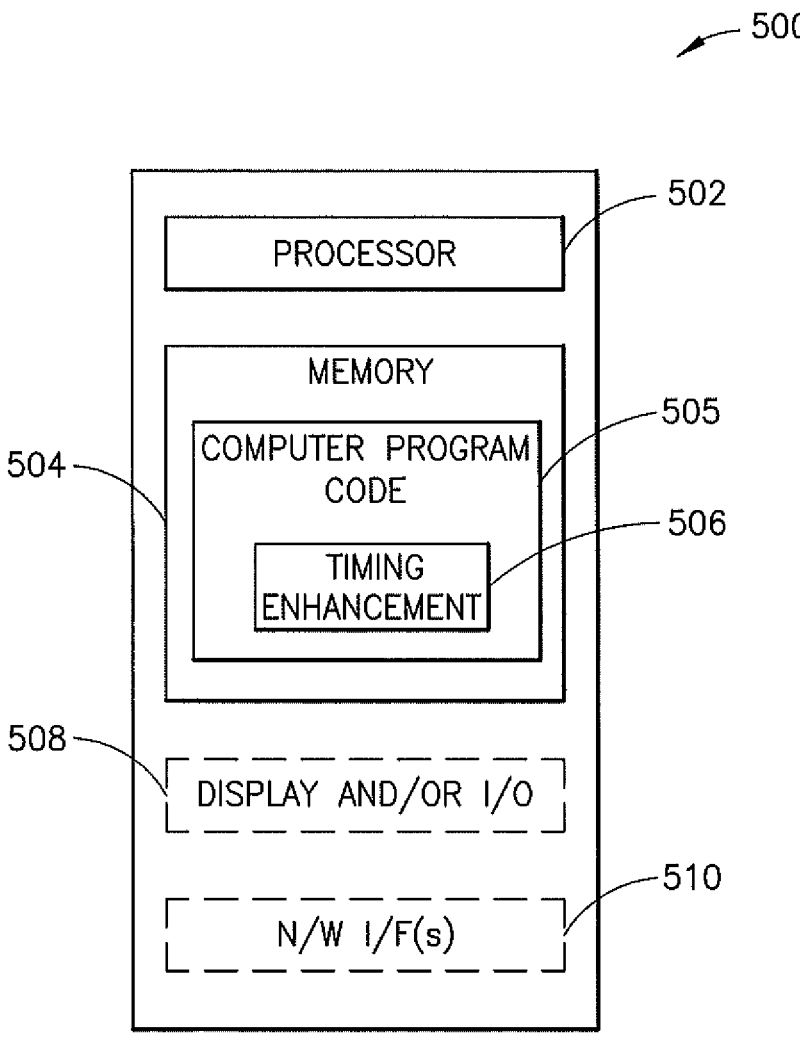
FIG. 11 is an apparatus configured to implement IAB timing enhancement, based on the examples described herein.

FIG. 11 is an example apparatus 500, which may be implemented in hardware, configured to implement the timing based on the examples described herein. The apparatus 500 comprises a processor 502, at least one non-transitory memory 504 including computer program code

505, where the at least one memory 504 and the computer program code 505 are configured to, with the at least one processor 502, cause the apparatus to implement circuitry, a process, component, module, or function (collectively timing enhancement 506) to implement TAB timing enhancement. The apparatus 500 optionally includes a display and/or I/O interface 508 that may be used to display aspects or a status of the methods described herein (e.g., as one of the methods is being performed or at a subsequent time). The apparatus 500 includes one or more network (N/W) interfaces (I/F(s)) 510. The N/W I/F(s) 510 may be wired and/or wireless and communicate over the Internet/other network(s) via any communication technique. The N/W I/F(s) 510 may comprise one or more transmitters and one or more receivers. The N/W I/F(s) 510 may comprise standard well-known components such as an amplifier, filter, frequency-converter, (de)modulator, and encoder/decoder circuitries and one or more antennas.

The apparatus 500 may be UE 110, RAN node 170, network element(s) 190, or IAB node 165/170*d*. Thus, processor 502 may correspond respectively to processor(s) 120, processor(s) 152, processor(s) 175, or processor(s) 4, memory 504 may correspond respectively to memory(ies) 125, memory(ies) 155, memory(ies) 171, or memory(ies) 6, computer program code 505 may correspond respectively to computer program code 123, module 140-1, module 140-2, computer program code 153, module 150-1, module 150-2, computer program code 173, CPC 8, IAB module 2-1 or IAB module 2-2, and N/W I/F(s) 510 may correspond respectively to N/W I/F(s) 161, N/W I/F(s) 180, or N/W I/F(s) 16. Alternatively, apparatus 500 may not correspond to either of UE 110, RAN node 170, network element(s) 190, or IAB node 165/170*d* (for example, apparatus 500 may be a remote, virtual or cloud apparatus).

References to a 'computer', 'processor', etc. should be understood to encompass not only computers having different architectures such as single/multi-processor architectures and sequential (Von Neumann)/parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

FIG. 12 is an example method 600, based on the example embodiments described herein. At 602, the method includes receiving a control element that is used to determine a timing mode and/or associated timing information for an integrated access and backhaul node. At 604, the method includes determining the timing mode and/or the associated timing information for the integrated access and backhaul node, based on the control element. At 606, the method includes applying the timing mode and/or the associated timing information for a subsequent uplink transmission for the integrated access and backhaul node. The method 600 may be performed by IAB node 165/170d, or by apparatus 500.

FIG. 13 is another example method 700, based on the example embodiments described herein. At 702, the method includes providing a control element that is used to determine a timing mode and/or associated timing information for an integrated access and backhaul node. At 704, the method includes where the timing mode and/or the associated timing information for the integrated access and backhaul node is determined based on the control element. At 706, the method includes receiving a subsequent uplink transmission from the integrated access and backhaul node, based on the determined timing mode and/or associated timing information. The method 700 may be performed by IAB node 165/170d, or by apparatus 500.

An example method includes receiving a control element that is used to determine a timing mode and/or associated timing information for an integrated access and backhaul node; determining the timing mode and/or the associated timing information for the integrated access and backhaul node, based on the control element; and applying the timing mode and/or the associated timing information for a subsequent uplink transmission for the integrated access and backhaul node.

Other aspects of the method may include the following. The control element may be used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The method may further include receiving a configuration of the timing mode for a given period from the parent node. The control element may be used to determine an over the air procedure for maintaining synchronization between child and parent DU TX timings while synchronizing child UL and DL TX timings. One or more reserved bits of the control element may be used to indicate the timing mode and/or the timing information. The method may further include where, in response to detecting at least one bit pattern, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to detecting at least one other bit pattern, the timing mode and/or associated timing information is determined to be a timing difference between uplink reception from the mobile termination part of the integrated access and backhaul node and downlink transmission at the parent node. The method may further include where, in response to detecting at least one bit pattern indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to detecting at least one other bit pattern not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. The subset of bits may be at least a last 11 bits of the reserved bits of the control element. The method may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information may not utilize MAC-CE signaling. An additional bit pattern may indicate configuration parameters of the timing mode and/or the associated timing information. The method may further include maintaining a propagation delay estimate based on a distributed unit transmission-reception offset signaled by a parent node; and obtaining a timing advance from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The method may further include determining whether a timing offset indicated by the timing mode is within range of possible indicated values; initiating a random access channel procedure on a next available preferred random access channel occasion to reset timing of the integrated access and backhaul node when the timing offset is out of range of the possible indicated values; and applying the timing offset relative to downlink reception timing of a mobile termination part of the integrated access and backhaul node and disregarding a timing advance configuration, when the timing offset is within range of the possible indicated values. The timing information may be indicated with the timing mode. The control element may be used to determine the timing information, where the timing information is related to the timing mode being case #1 timing or case #6 timing.

An example method includes providing a control element that is used to determine a timing mode and/or associated timing information for an integrated access and backhaul node; where the timing mode and/or the associated timing information for the integrated access and backhaul node is determined based on the control element; and receiving a subsequent uplink transmission from the integrated access and backhaul node, based on the determined timing mode and/or associated timing information.

Other aspects of the method may include the following. The control element may be used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The method may further include providing a configuration of the timing mode for a given period for the integrated access and backhaul node. The control element may be used to determine an over the air procedure for maintaining synchronization between child and parent DU TX timings while synchronizing child UL and DL TX timings. One or more reserved bits of the control element may be used to indicate the timing mode and/or the timing information. The method may further include where, in response to at least one bit pattern being detected, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to at least one other bit pattern being detected, the timing mode and/or associated timing information is determined to be a timing difference between uplink reception from the mobile termination part of the integrated access and backhaul node and downlink transmission at the parent node. The method may further include where, in response to at least one bit pattern being detected indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to at least one other bit pattern being detected not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. The subset of bits may be at least a last 11 bits of the reserved bits of the control element. The method may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information may not utilize MAC-CE signaling. An additional bit pattern may indicate configuration parameters of the timing mode and/or the associated timing information. The method may further include where: a propagation delay estimate is maintained based on a distributed unit transmission-reception offset signaled by a parent node; and a timing advance is obtained from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The method may further include where: whether a timing offset indicated by the timing mode is within range of possible indicated values is determined; a random access channel procedure is initiated on a next available preferred random access channel occasion to reset timing of the integrated access and backhaul node when the timing offset is out of range of the possible indicated values; and the timing offset is applied relative to downlink reception timing of a mobile termination part of the integrated access and backhaul node and a timing advance configuration disregarded, when the timing offset is within range of the possible indicated values. The timing information may be indicated with the timing mode. The control element may be used to determine the timing information, where the timing information is related to the timing mode being case #1 timing or case #6 timing.

An example apparatus includes at least one processor; and at least one non-transitory memory including computer program code; where the at least one memory and the computer program code are configured to, with the at least one processor, cause the apparatus at least to perform: receive a control element that is used to determine a timing mode and/or associated timing information for an integrated access and backhaul node; determine the timing mode and/or the associated timing information for the integrated access and backhaul node, based on the control element; and apply the timing mode and/or the associated timing information for a subsequent uplink transmission for the integrated access and backhaul node.

Other aspects of the apparatus may include the following. The control element may be used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The at least one memory and the computer program code may be further configured to, with the at least one processor, cause the apparatus at least to perform: receive a configuration of the timing mode for a given period from the parent node. The control element may be used to determine an over the air procedure for maintaining synchronization between child and parent DU TX timings while synchronizing child UL and DL TX timings. One or more reserved bits of the control element are used to indicate the timing mode and/or the timing information. The apparatus may further include where: in response to detecting at least one bit pattern, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to detecting at least one other bit pattern, the timing mode and/or associated timing information is determined to be a timing difference between uplink reception from the mobile termination part of the integrated access and backhaul node and downlink transmission at the parent node. The apparatus may further include where: in response to detecting at least one bit pattern indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to detecting at least one other bit pattern not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. The subset of bits may be at least a last 11 bits of the reserved bits of the control element. The apparatus may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information may not not utilize MAC-CE signaling. An additional bit pattern may indicate configuration parameters of the timing mode and/or the associated timing information. The at least one memory and the computer program code may be further configured to, with the at least one processor, cause the apparatus at least to perform: maintain a propagation delay estimate based on a distributed unit transmission-reception offset signaled by a parent node; and obtain a timing advance from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The at least one memory and the computer program code may be further configured to, with the at least one processor, cause the apparatus at least to perform: determine whether a timing offset indicated by the timing mode is within range of possible indicated values; initiate a random access channel procedure on a next available preferred random access channel occasion to reset timing of the integrated access and backhaul node when the timing offset is out of range of the possible indicated values; and apply the timing offset relative to downlink reception timing of a mobile termination part of the integrated access and backhaul node and disregarding a timing advance configuration, when the timing offset is within range of the possible indicated values. The timing information may be indicated with the timing mode. The control element may be used to determine the timing information, where the timing information is related to the timing mode being case #1 timing or case #6 timing.

An example apparatus includes at least one processor; and at least one non-transitory memory including computer program code; where the at least one memory and the computer program code are configured to, with the at least one processor, cause the apparatus at least to perform: provide a control element that is used to determine a timing mode and/or associated timing information for an integrated access and backhaul node; where the timing mode and/or the associated timing information for the integrated access and backhaul node is determined based on the control element; and receive a subsequent uplink transmission from the integrated access and backhaul node, based on the determined timing mode and/or associated timing information.

Other aspects of the apparatus may include the following. The control element is used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The at least one memory and the computer program code may be further configured to, with the at least one processor, cause the apparatus at least to perform: provide a configuration of the timing mode for a given period for the integrated access and backhaul node. The control element may be used to determine an over the air procedure for maintaining synchronization between child and parent DU TX timings while synchronizing child UL and DL TX timings. One or more reserved bits of the control element may be used to indicate the timing mode and/or the timing information. The apparatus may further include where: in response to at least one bit pattern being detected, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to at least one other bit pattern being detected, the timing mode and/or associated timing information is determined to be a timing difference between uplink reception from the mobile termination part of the integrated access and backhaul node and downlink transmission at the parent node. The apparatus may further include where: in response to at least one bit pattern being detected indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to at least one other bit pattern being detected not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. A subset of bits may be at least a last 11 bits of the reserved bits of the control element. The apparatus may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information does not utilize MAC-CE signaling. An additional bit pattern may indicate configuration parameters of the timing mode and/or the associated timing information. The apparatus may further include where: a propagation delay estimate is maintained based on a distributed unit transmission-reception offset signaled by a parent node; and a timing advance is obtained from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The apparatus may further include where: whether a timing offset indicated by the timing mode is within range of possible indicated values is determined; a random access channel procedure is initiated on a next available preferred random access channel occasion to reset timing of the integrated access and backhaul node when the timing offset is out of range of the possible indicated values; and the timing offset is applied relative to downlink reception timing of a mobile termination part of the integrated access and backhaul node and a timing advance configuration disregarded, when the timing offset is within range of the possible indicated values. The timing information may be indicated with the timing mode. The control element may be used to determine the timing information, where the timing information is related to the timing mode being case #1 timing or case #6 timing.

An example apparatus includes means for receiving a control element that is used to determine a timing mode and/or associated timing information for an integrated access and backhaul node; means for determining the timing mode and/or the associated timing information for the integrated access and backhaul node, based on the control element; and means for applying the timing mode and/or the associated timing information for a subsequent uplink transmission for the integrated access and backhaul node.

Other aspects of the apparatus may include the following. The control element may be used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The apparatus may further include means for receiving a configuration of the timing mode for a given period from the parent node. The control element may be used to determine an over the air procedure for maintaining synchronization between child and parent DU TX timings while synchronizing child UL and DL TX timings. One or more reserved bits of the control element may be used to indicate the timing mode and/or the timing information. The apparatus may further include where: in response to detecting at least one bit pattern, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to detecting at least one other bit pattern, the timing mode and/or associated timing information is determined to be a timing difference between uplink reception from the mobile termination part of the integrated access and backhaul node and downlink transmission at the parent node. The apparatus may further include where: in response to detecting at least one bit pattern indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to detecting at least one other bit pattern not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. The subset of bits may be at least a last 11 bits of the reserved bits of the control element. The apparatus may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information may not utilize MAC-CE signaling. An additional bit pattern may indicate configuration parameters of the timing mode and/or the associated timing information. The apparatus may further include means for maintaining a propagation delay estimate based on a distributed unit transmission-reception offset signaled by a parent node; and means for obtaining a timing advance from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The apparatus may further include means for determining whether a timing offset indicated by the timing mode is within range of possible indicated values; means for initiating a random access channel procedure on a next available preferred random access channel occasion to reset timing of the integrated access and backhaul node when the timing offset is out of range of the possible indicated values; and means for applying the timing offset relative to downlink reception timing of a mobile termination part of the integrated access and backhaul node and disregarding a timing advance configuration, when the timing offset is within range of the possible indicated values. The timing information may be indicated with the timing mode. The control element may be used to determine the timing information, where the timing information is related to the timing mode being case #1 timing or case #6 timing.

An example apparatus includes means for providing a control element that is used to determine a timing mode and/or associated timing information for an integrated access and backhaul node; where the timing mode and/or the associated timing information for the integrated access and backhaul node is determined based on the control element; and means for receiving a subsequent uplink transmission from the integrated access and backhaul node, based on the determined timing mode and/or associated timing information.

Other aspects of the apparatus may include the following. The control element is used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The apparatus may further include means for providing a configuration of the timing mode for a given period for the integrated access and backhaul node. The control element may be used to determine an over the air procedure for maintaining synchronization between child and parent DU TX timings while synchronizing child UL and DL TX timings. One or more reserved bits of the control element may be used to indicate the timing mode and/or the timing information. The apparatus may further include where: in response to at least one bit pattern being detected, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to at least one other bit pattern being detected, the timing mode and/or associated timing information is determined to be a timing difference between uplink reception from the mobile termination part of the integrated access and backhaul node and downlink transmission at the parent node. The apparatus may further include where: in response to at least one bit pattern being detected indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to at least one other bit pattern being detected not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. A subset of bits may be at least a last 11 bits of the reserved bits of the control element. The apparatus may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information may not utilize MAC-CE signaling. An additional bit pattern may indicate configuration parameters of the timing mode and/or the associated timing information. The apparatus may further include where: a propagation delay estimate is maintained based on a distributed unit transmission-reception offset signaled by a parent node; and a timing advance is obtained from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The apparatus may further include where: whether a timing offset indicated by the timing mode is within range of possible indicated values is determined; a random access channel procedure is initiated on a next available preferred random access channel occasion to reset timing of the integrated access and backhaul node when the timing offset is out of range of the possible indicated values; and the timing offset is applied relative to downlink reception timing of a mobile termination part of the integrated access and backhaul node and a timing advance configuration disregarded, when the timing offset is within range of the possible indicated values. The timing information may be indicated with the timing mode. The control element may be used to determine the timing information, where the timing information is related to the timing mode being case #1 timing or case #6 timing.

An example non-transitory program storage device readable by a machine, tangibly embodying a program of instructions executable by the machine for performing operations is provided, the operations comprising: receiving a control element that is used to determine a timing mode and/or associated timing information for an integrated access and backhaul node; determining the timing mode and/or the associated timing information for the integrated access and backhaul node, based on the control element; and applying the timing mode and/or the associated timing information for a subsequent uplink transmission for the integrated access and backhaul node.

Other aspects of the non-transitory program storage device may include the following. The control element may be used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The operations of the non-transitory program storage device may further include receiving a configuration of the timing mode for a given period from the parent node. The control element may be used to determine an over the air procedure for maintaining synchronization between child and parent DU TX timings while synchronizing child UL and DL TX timings. One or more reserved bits of the control element may be used to indicate the timing mode and/or the timing information. The non-transitory program storage device may further include where: in response to detecting at least one bit pattern, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to detecting at least one other bit pattern, the timing mode and/or associated timing information is determined to be a timing difference between uplink reception from the mobile termination part of the integrated access and backhaul node and downlink transmission at the parent node. The non-transitory program storage device may further include where: in response to detecting at least one bit pattern indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to detecting at least one other bit pattern not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. The subset of bits may be at least a last 11 bits of the reserved bits of the control element. The non-transitory program storage device may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information may not utilize MAC-CE signaling. An additional bit pattern may indicate configuration parameters of the timing mode and/or the associated timing information. The operations of the non-transitory program storage device may further include maintaining a propagation delay estimate based on a distributed unit transmission-reception offset signaled by a parent node; and obtaining a timing advance from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The operations of the non-transitory program storage device may further include determining whether a timing offset indicated by the timing mode is within range of possible indicated values; initiating a random access channel procedure on a next available preferred random access channel occasion to reset timing of the integrated access and backhaul node when the timing offset is out of range of the possible indicated values; and applying the timing offset relative to downlink reception timing of a mobile termination part of the integrated access and backhaul node and disregarding a timing advance configuration, when the timing offset is within range of the possible indicated values. The timing information may be indicated with the timing mode. The control element may be used to determine the timing information, where the timing information is related to the timing mode being case #1 timing or case #6 timing.

An example non-transitory program storage device readable by a machine, tangibly embodying a program of instructions executable by the machine for performing operations is provided, the operations comprising: providing a control element that is used to determine a timing mode and/or associated timing information for an integrated access and backhaul node; where the timing mode and/or the associated timing information for the integrated access and backhaul node is determined based on the control element; and receiving a subsequent uplink transmission from the integrated access and backhaul node, based on the determined timing mode and/or associated timing information.

Other aspects of the non-transitory program storage device may include the following. The control element may be used to determine at least one of: a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; or a timing difference between uplink reception from the mobile termination part of the integrated access and backhaul node and downlink transmission at the parent node. The operations of the non-transitory program storage device may further include providing a configuration of the timing mode for a given period for the integrated access and backhaul node. The control element may used to determine an over the air procedure for maintaining synchronization between child and parent DU TX timings while synchronizing child UL and DL TX timings. One or more reserved bits of the control element may be used to indicate the timing mode and/or the timing information. The non-transitory program storage device may further include where: in response to at least one bit pattern being detected, the timing mode and/or associated timing information is determined to be based on a timing delta, where the timing delta is timing information to align distributed unit downlink transmission of the integrated access and backhaul node with a parent node downlink transmission when a timing advance is applied for transmission from a mobile termination part of the integrated access and backhaul node using a different control element; and in response to at least one other bit pattern being detected, the timing mode and/or associated timing information is determined to be a timing difference between uplink reception from the mobile termination part of the integrated access and backhaul node and downlink transmission at the parent node. The non-transitory program storage device may further include where: in response to at least one bit pattern being detected indicating a procedure for maintaining synchronization between a mobile termination part of the integrated access and backhaul node and a distributed unit of the integrated access and backhaul node, the timing mode and/or associated timing information is determined to be, based on a subset of the reserved bits of the control element, a timing difference between uplink reception from the mobile termination part of the integrated access and backhaul node and downlink transmission at a parent node; and in response to at least one other bit pattern being detected not indicating the procedure for maintaining synchronization between the mobile termination part of the integrated access and backhaul node and a distributed unit of the integrated access and backhaul node, the timing mode and/or associated timing information is determined to be, based on a subset of the reserved bits of the control element, based on a timing delta where the timing delta is timing information to align distributed unit downlink transmission of the integrated access and backhaul node with a parent downlink transmission when a timing advance is applied for transmission from the mobile termination part of the integrated access and backhaul node using a different control element. The subset of bits may be at least a last 11 bits of the reserved bits of the control element. The non-transitory program storage device may further include where in response to a slot in which the control element is recovered not being configured for time division multiplexing operation, or a slot immediately following the slot in which the control element is recovered not being configured for time division multiplexing operation, the timing mode is determined to be based on downlink reception of a mobile termination part of the integrated access and backhaul node, rather than being based on a timing advance offset. The timing mode and/or timing information may not utilize MAC-CE signaling. An additional bit pattern may indicate configuration parameters of the timing mode and/or the associated timing information. The non-transitory program storage device may further include where: a propagation delay estimate is maintained based on a distributed unit transmission-reception offset signaled by a parent node; and a timing advance is obtained from the propagation delay estimate and a timing delta related to an uplink reception and downlink transmission timing difference in a parent distributed unit when operating in case #1. The control element may be further used for distributed unit transmission-reception offset signaling. The control element may be a medium access control element. The non-transitory program storage device may further include where: whether a timing offset indicated by the timing mode is within range of possible indicated values is determined; a random access channel procedure is initiated on a next available preferred random access channel occasion to reset timing of the integrated access and backhaul node when the timing offset is out of range of the possible indicated values; and the timing offset is applied relative to downlink reception timing of a mobile termination part of the integrated access and backhaul node and a timing advance configuration disregarded, when the timing offset is within range of the possible indicated values. The timing information may be indicated with the timing mode. The control element may be used to determine the timing information, where the timing information is related to the timing mode being case #1 timing or case #6 timing.

An example apparatus may include one or more circuitries configured to implement any of the methods described herein, including receiving a control element that is used to determine a timing mode and/or associated timing information for an integrated access and backhaul node; determining the timing mode and/or the associated timing information for the integrated access and backhaul node, based on the control element; and applying the timing mode and/or the associated timing information for a subsequent uplink transmission for the integrated access and backhaul node.

An example apparatus may include one or more circuitries configured to implement any of the methods described herein, including providing a control element that is used to determine a timing mode and/or associated timing information for an integrated access and backhaul node; where the timing mode and/or the associated timing information for the integrated access and backhaul node is determined based on the control element; and receiving a subsequent uplink transmission from the integrated access and backhaul node, based on the determined timing mode and/or associated timing information.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

What is claimed is:

1. A method, comprising:

receiving, with a first integrated access and backhaul node from a second integrated access and backhaul node, a medium access control control element that is used to determine a timing mode and associated timing information for the first integrated access and backhaul node;

in response to detecting at least one bit pattern of the medium access control control element that indicates the timing mode, determining the associated timing information signaled within the medium access control control element to be a timing difference between uplink reception with a distributed unit of the second integrated access and backhaul node from a mobile termination part of the first integrated access and backhaul node, and downlink transmission from the distributed unit of the second integrated access and backhaul node to the mobile termination part of the first integrated access and backhaul node;

in response to detecting at least one other bit pattern of the medium access control control element that indicates the timing mode, the at least one other bit pattern of the medium access control control element being different from the at least one bit pattern of the medium access control control element, determining the associated timing information signaled within the medium access control control element to be an offset used to align a timing of a distributed unit of the first integrated access and backhaul node with a downlink transmission timing of the second integrated access and backhaul node;

applying the timing mode and the associated timing information for an uplink transmission from the first integrated access and backhaul node; and synchronizing, based on the timing difference, the uplink transmission from the mobile termination part of the first integrated access and backhaul node with downlink transmission from the distributed unit of the first integrated access and backhaul node, wherein the synchronizing is performed with the first integrated access and backhaul node.

2. The method of claim 1, wherein the at least one bit pattern of the medium access control control element that indicates the timing mode and the at least one other bit pattern of the medium access control element that indicates the timing mode are part of reserved bits of the medium access control control element, and the associated timing information is part of a set of bits of the medium access control control element other than the reserved bits of the medium access control control element.

3. A non-transitory computer-readable medium comprising program instructions stored thereon which are configured to, when executed with at least one processor, cause the at least one processor to perform the method of claim 1.

4. The method of claim 1, wherein:

the at least one bit pattern that indicates the timing mode comprises reserved bits of the medium access control control element being set to zero, and the at least one other bit pattern that indicates the timing mode comprises at least one reserved bit of the medium access control control element being set to one, or the at least one other bit pattern that indicates the timing mode comprises reserved bits of the medium access control control element being set to zero, and the at least one bit pattern that indicates the timing mode comprises at least one reserved bit of the medium access control control element being set to one.

5. The method of claim 1, wherein another pattern of the medium access control control element different from the at least one bit pattern and the at least one other bit pattern indicates at least one configuration parameter of the timing mode or the associated timing information.

6. The method of claim 1, further comprising receiving an indication to use an alternative timing offset for transmissions unrelated to time division multiplexing when operating in a mode without time division multiplexing.

7. The method of claim 1, further comprising:

maintaining a propagation delay estimate based on the timing difference; and obtaining a timing advance from the propagation delay estimate and the offset.

8. The method of claim 1, further comprising:

in response to a slot in which the medium access control control element is recovered not being configured for time division multiplexing operation, or a slot following the slot in which the medium access control control element is recovered not being configured for time division multiplexing operation, determining the timing mode and the associated timing information to be based on the timing difference between uplink reception with the distributed unit of the second integrated access and backhaul node from the mobile termination part of the first integrated access and backhaul node and downlink transmission from the distributed unit of the second integrated access and backhaul node to the mobile termination part of the first integrated access and backhaul node.

9. The method of claim 1, where the timing mode and the associated timing information is based on case #1 timing or case #6 timing, where case #1 timing and case #6 timing correspond to use of an over the air procedure to maintain synchronization between distributed unit transmission at the first integrated access and backhaul node and distributed unit transmission at the second integrated access and backhaul node, and where case #6 timing further corresponds to where the distributed unit of the first integrated access and backhaul node and the mobile termination part of the first integrated access and backhaul node are transmitting simultaneously.

10. The method of claim 1, further comprising:

determining whether a timing offset indicated with the timing mode is within range of possible indicated values;

initiating a random access channel procedure on a next available preferred random access channel occasion to reset timing of the first integrated access and backhaul node when the timing offset is out of range of the possible indicated values; and applying the timing offset relative to downlink reception timing of the mobile termination part of the first integrated access and backhaul node and disregarding a timing advance configuration, when the timing offset is within range of the possible indicated values.

11. A method comprising:

transmitting, from a first integrated access and backhaul node to a second integrated access and backhaul node, a medium access control control element that is used to determine a timing mode and associated timing information for the second integrated access and backhaul node;

indicating the timing mode using at least one bit pattern of the medium access control control element, wherein when the at least one bit pattern indicates the timing mode, the associated timing information signaled within the medium access control control element comprises a timing difference between uplink reception with a distributed unit of the first integrated access and backhaul node from a mobile termination part of the second integrated access and backhaul node, and downlink transmission from the distributed unit of the first integrated access and backhaul node to the mobile termination part of the second integrated access and backhaul node;

indicating the timing mode using at least one other bit pattern of the medium access control control element, the at least one other bit pattern of the medium access control control element being different from the at least one bit pattern of the medium access control control element, wherein when the at least one other bit pattern indicates the timing mode, the associated timing information signaled within the medium access control control element comprises an offset used to align a timing of a distributed unit of the second integrated access and backhaul node with a downlink transmission timing of the first integrated access and backhaul node;

receiving an uplink transmission from the second integrated access and backhaul node, based on the timing mode and the associated timing information;

wherein the timing difference is configured to be used with the second integrated access and backhaul node to synchronize the uplink transmission from the mobile termination part of the second integrated access and backhaul node with downlink transmission from the distributed unit of the second integrated access and backhaul node.

12. The method of claim 11, wherein the at least one bit pattern of the medium access control control element that indicates the timing mode and the at least one other bit pattern of the medium access control control element that indicates the timing mode are part of reserved bits of the medium access control control element, and the associated timing information is part of a set of bits of the medium access control control element other than the reserved bits of the medium access control control element.

13. The method of claim 12, further comprising transmitting a configuration of the timing mode for a given period for the second integrated access and backhaul node.

14. A non-transitory computer-readable medium comprising program instructions stored thereon which are configured to, when executed with at least one processor, cause the at least one processor to perform the method of claim 11.

15. The method of claim 11, wherein:

the at least one bit pattern that indicates the timing mode comprises reserved bits of the medium access control control element being set to zero, and the at least one other bit pattern that indicates the timing mode comprises at least one reserved bit of the medium access control control element being set to one, or the at least one other bit pattern that indicates the timing mode comprises reserved bits of the medium access control control element being set to zero, and the at least one bit pattern that indicates the timing mode comprises at least one reserved bit of the medium access control control element being set to one.

16. The method of claim 11, further comprising transmitting an indication to use an alternative timing offset for transmissions unrelated to time division multiplexing when operating in a mode without time division multiplexing.

17. The method of claim 11, wherein:

a propagation delay estimate is maintained based on the timing difference, and a timing advance is obtained from the propagation delay estimate and the offset.

18. The method of claim 11, further comprising:

indicating the timing mode implicitly to be based on the timing difference between uplink reception with the distributed unit of the first integrated access and backhaul node from the mobile termination part of the second integrated access and backhaul node and downlink transmission from the distributed unit of the first integrated access and backhaul node to the mobile termination part of the second integrated access and backhaul node, when the medium access control control element is transmitted in a slot not configured for time division multiplexing operation or when a slot following a slot in which the medium access control control element is transmitted is not configured for time division multiplexing.

19. The method of claim 11, where the timing mode and the associated timing information is based on case #1 timing or case #6 timing, where case #1 timing and case #6 timing correspond to use of an over the air procedure to maintain synchronization between distributed unit transmission at the second integrated access and backhaul node and distributed unit transmission at the first integrated access and backhaul node, and where case #6 timing further corresponds to where a distributed unit of the second integrated access and backhaul node and the mobile termination part of the second integrated access and backhaul node are transmitting simultaneously.

20. An apparatus comprising:

at least one processor; and at least one non-transitory memory storing instructions that, when executed by the at least one processor, cause the apparatus at least to:

receive, with a first integrated access and backhaul node from a second integrated access and backhaul node, a medium access control control element that is used to determine a timing mode and associated timing information for the first integrated access and backhaul node;

in response to detecting at least one bit pattern of the medium access control control element that indicates the timing mode, determine the associated timing information signaled within the medium access control control element to be a timing difference between uplink reception with a distributed unit of the second integrated access and backhaul node from a mobile termination part of the first integrated access and backhaul node, and downlink transmission from the distributed unit of the second integrated access and backhaul node to the mobile termination part of the first integrated access and backhaul node;

in response to detecting at least one other bit pattern of the medium access control control element that indicates the timing mode, the at least one other bit pattern of the medium access control control element being different from the at least one bit pattern of the medium access control control element, determine the associated timing information signaled within the medium access control control element to be an offset used to align a timing of a distributed unit of the first integrated access and backhaul node with a downlink transmission timing of the second integrated access and backhaul node;

apply the timing mode and the associated timing information for an uplink transmission from the first integrated access and backhaul node;

synchronize, based on the timing difference, the uplink transmission from the mobile termination part of the first integrated access and backhaul node with downlink transmission from the distributed unit of the first integrated access and backhaul node, wherein the synchronizing is performed with the first integrated access and backhaul node.

21. The apparatus of claim 20, wherein the at least one bit pattern of the medium access control control element that indicates the timing mode and the at least one other bit pattern of the medium access control element that indicates the timing mode are part of reserved bits of the medium access control control element, and the associated timing information is part of a set of bits of the medium access control control element other than the reserved bits of the medium access control control element.

\*  \*  \*  \*  \*